United States Patent [19]
Maruyama et al.

[11] Patent Number: 4,878,110
[45] Date of Patent: Oct. 31, 1989

[54] COLOR IMAGE PROCESSING APPARATUS WHICH ACCURATELY REGISTERS MULTIPLE COLOR IMAGES BY COUNTING PULSES FROM A TIMER RESET BY A DRUM INDEX SIGNAL

[75] Inventors: Hiroyuki Maruyama; Tadao Kishimoto; Toshifumi Isobe; Jun Yokobori, all of Hachioji, Japan

[73] Assignee: Konishiroku Photo Industry Co., Ltd., Tokyo, Japan

[21] Appl. No.: 85,087

[22] Filed: Aug. 13, 1987

[51] Int. Cl.[4] ................................................. H04N 1/46
[52] U.S. Cl. ........................................... 358/75; 358/80
[58] Field of Search ................................ 358/75, 78, 80

[56] References Cited

U.S. PATENT DOCUMENTS

| 4,467,348 | 8/1984 | Fujii et al. | 358/78 |
| 4,547,062 | 10/1985 | Fujiwhara | 355/14 |
| 4,558,356 | 12/1985 | Toda et al. | 358/75 |
| 4,580,889 | 4/1986 | Hiranuma et al. | 358/75 |
| 4,652,913 | 3/1987 | Saitoh et al. | 358/80 |
| 4,667,227 | 5/1987 | Ikeda | 358/75 |
| 4,673,972 | 6/1987 | Yokomizo | 358/78 |
| 4,675,696 | 6/1987 | Suzuki | 358/78 |
| 4,680,625 | 7/1987 | Shoji et al. | 358/80 |
| 4,694,502 | 9/1987 | Ozawa et al. | 358/80 |
| 4,703,346 | 10/1987 | Bierhoff | 358/75 |
| 4,721,969 | 1/1988 | Asano | 358/80 |

FOREIGN PATENT DOCUMENTS

| 0050481 | 4/1982 | European Pat. Off. | 358/75 |
| 0220319 | 5/1987 | European Pat. Off. | |
| 3105985 | 12/1981 | Fed. Rep. of Germany | |
| 3643321 | 6/1987 | Fed. Rep. of Germany | 358/75 |
| 50-12370[U] | 4/1975 | Japan | |
| 52-37377 | 9/1977 | Japan | |
| 57-167034 | 10/1982 | Japan | |
| 57-210773 | 12/1982 | Japan | 358/75 |
| 59-101966 | 6/1984 | Japan | 358/75 |
| 59-134978 | 8/1984 | Japan | 358/75 |
| 59-226559 | 12/1984 | Japan | 358/75 |
| 59-226563 | 12/1984 | Japan | 358/78 |
| 59-226564 | 12/1984 | Japan | 358/78 |
| 60-85670 | 5/1985 | Japan | 358/75 |
| 60-85674 | 5/1985 | Japan | 358/75 |
| 60-139062 | 7/1985 | Japan | 358/75 |
| 60-199266 | 10/1985 | Japan | 358/75 |
| 61-118775 | 6/1986 | Japan | |

Primary Examiner—James J. Groody
Assistant Examiner—Randall S. Svihla
Attorney, Agent, or Firm—Jordan B. Bierman

[57] ABSTRACT

In a color image processing apparatus according to the invention, a color image signal being photoelectrically obtained by a image reader is separated into red, blue and black color component signals. A laser scanner writes respective latent images corresponding to the color component signals on a cylindrical photoreceptor. Each of the respective latent images are written during one rotation of the photoreceptor. The initial writing positions of the respective latent images are registered by using a drum index signal generated in synchronization with the rotation of the photoreceptor. An optical output starts outputting an optical signal in response to the index signal or an encoder signal selected according to the copy mode.

19 Claims, 34 Drawing Sheets

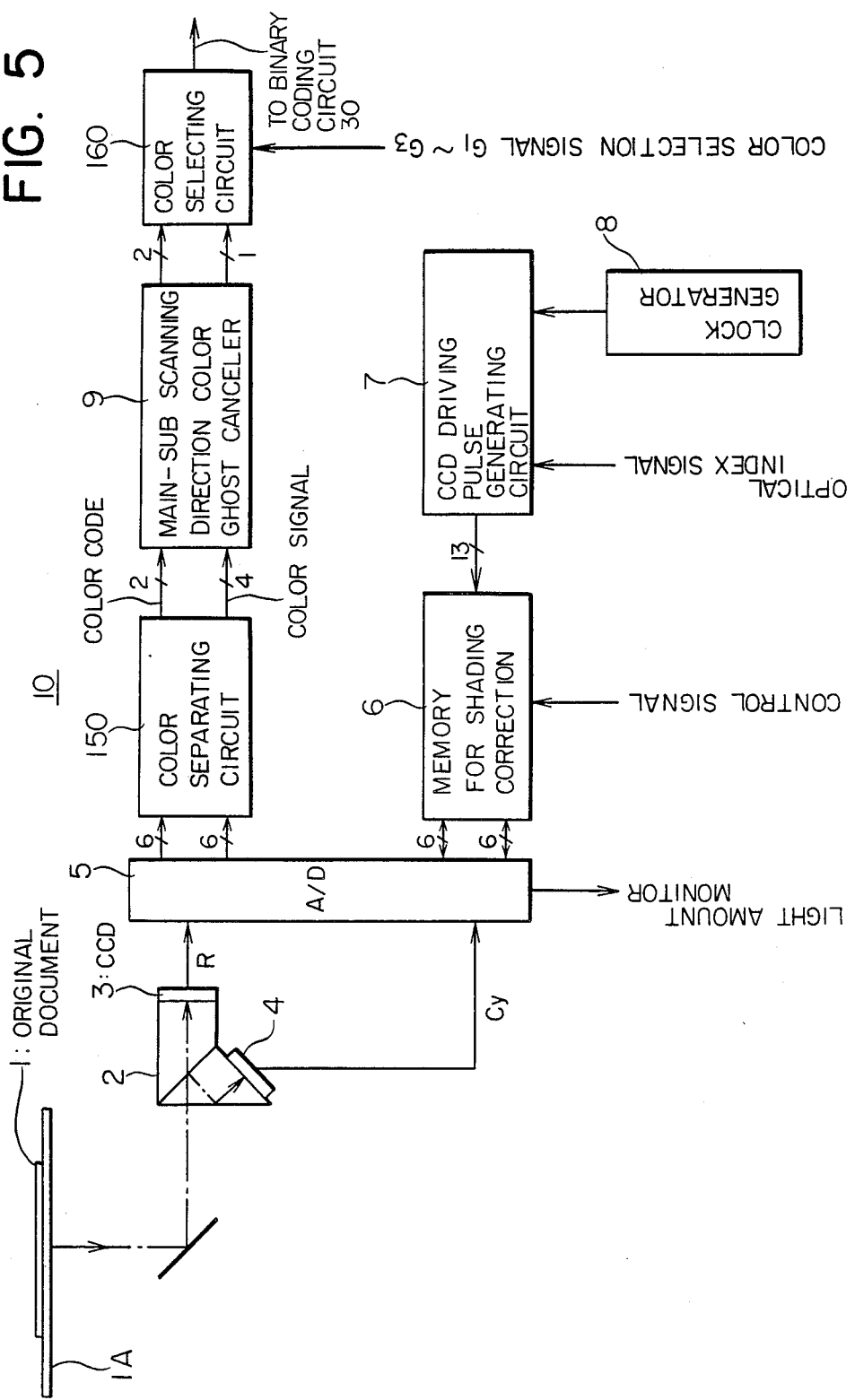

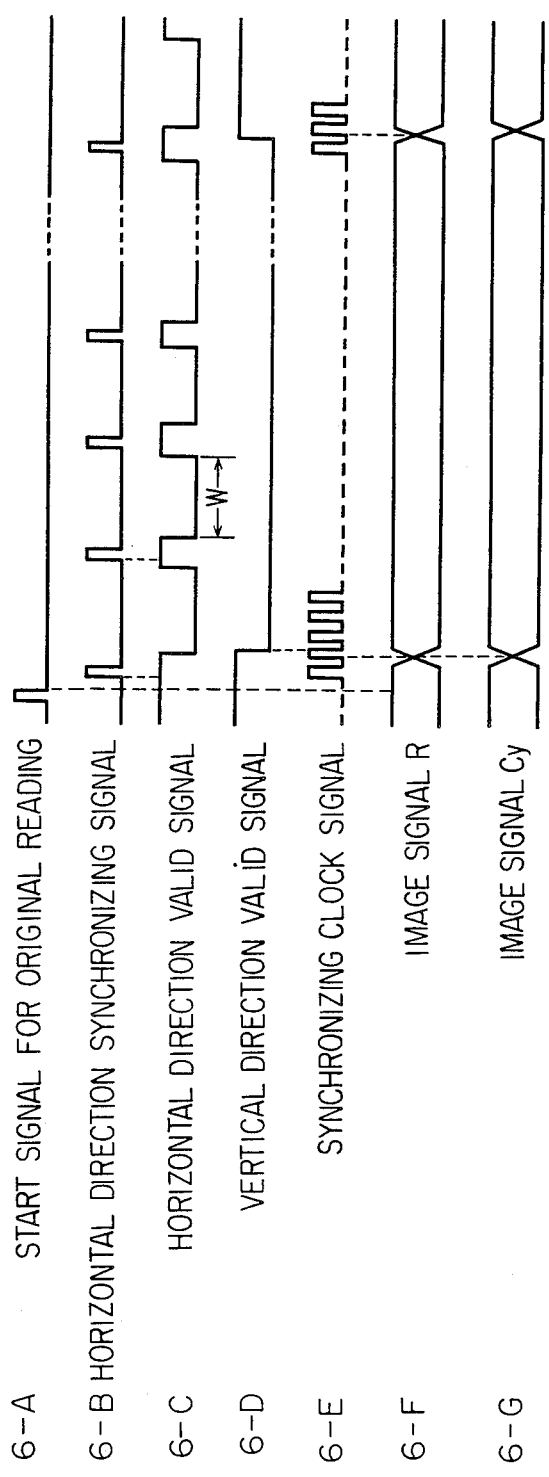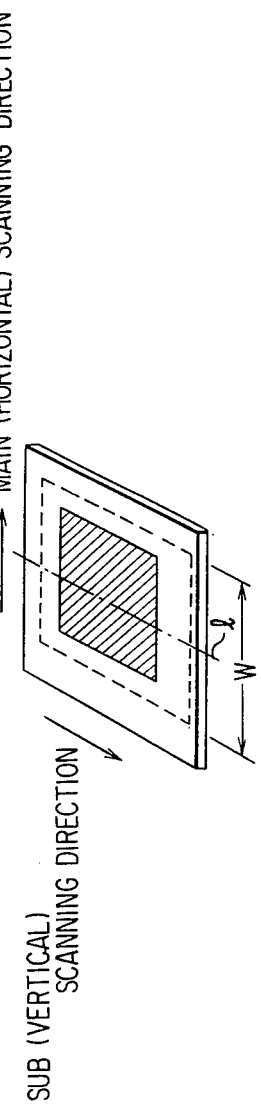

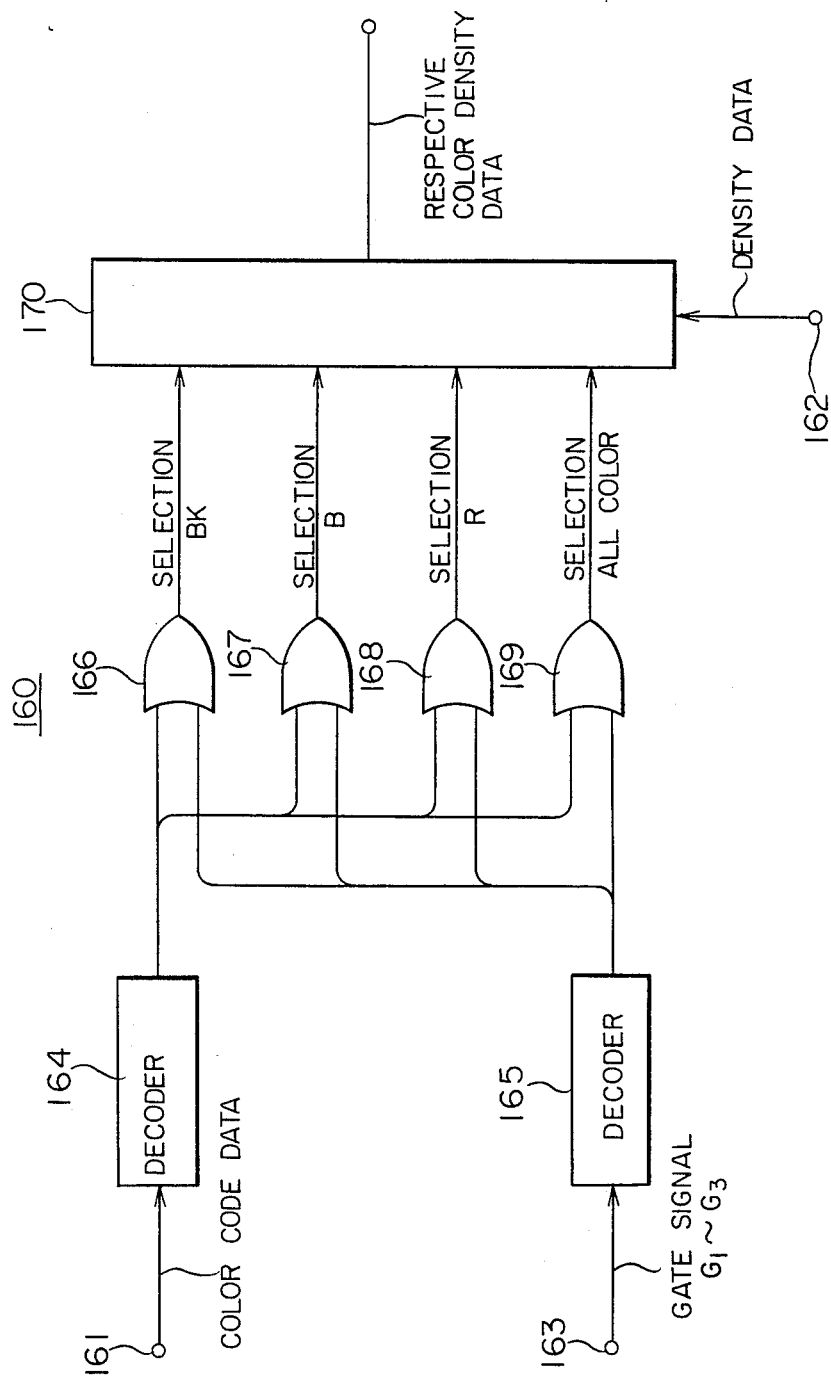

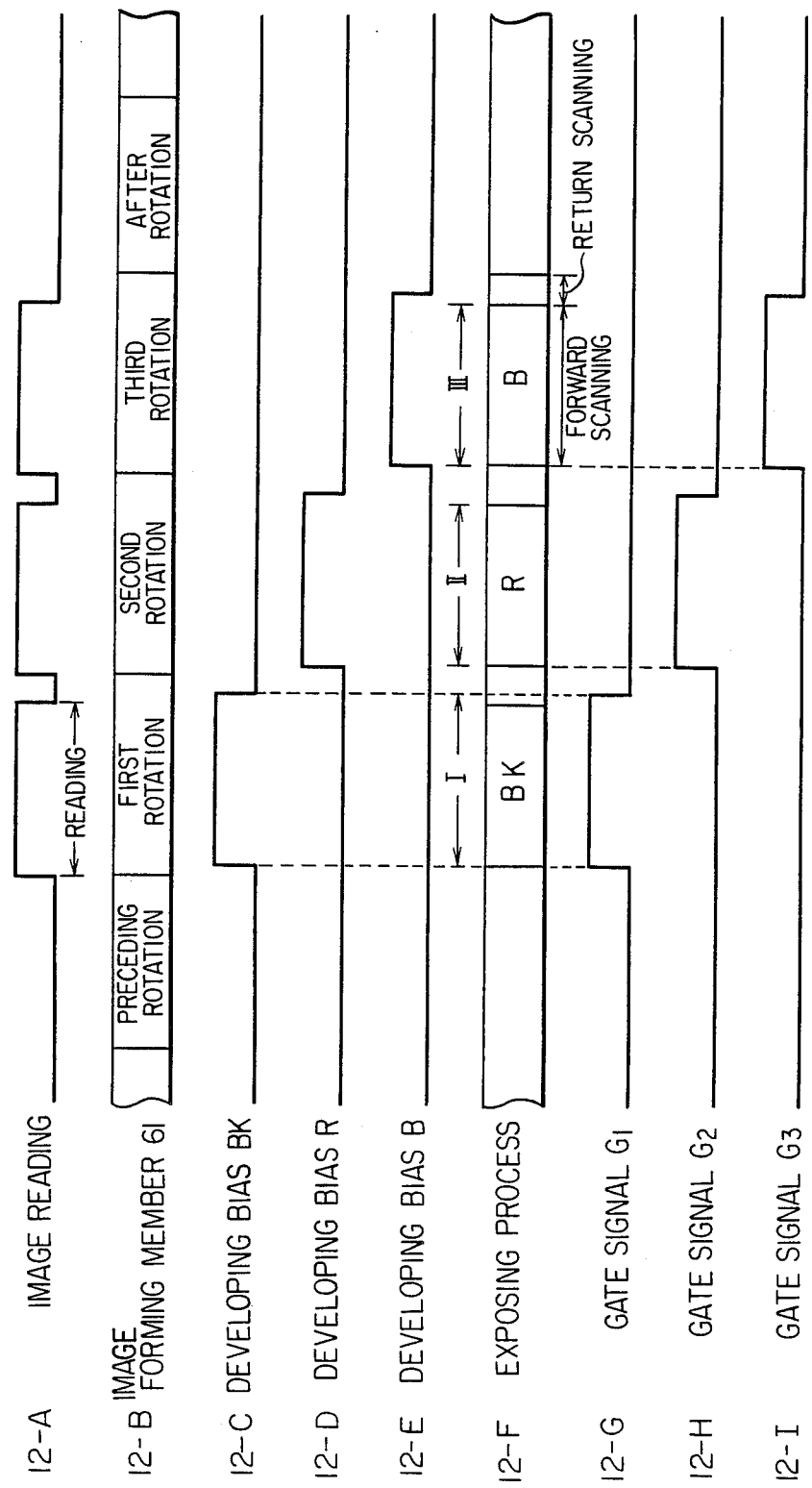

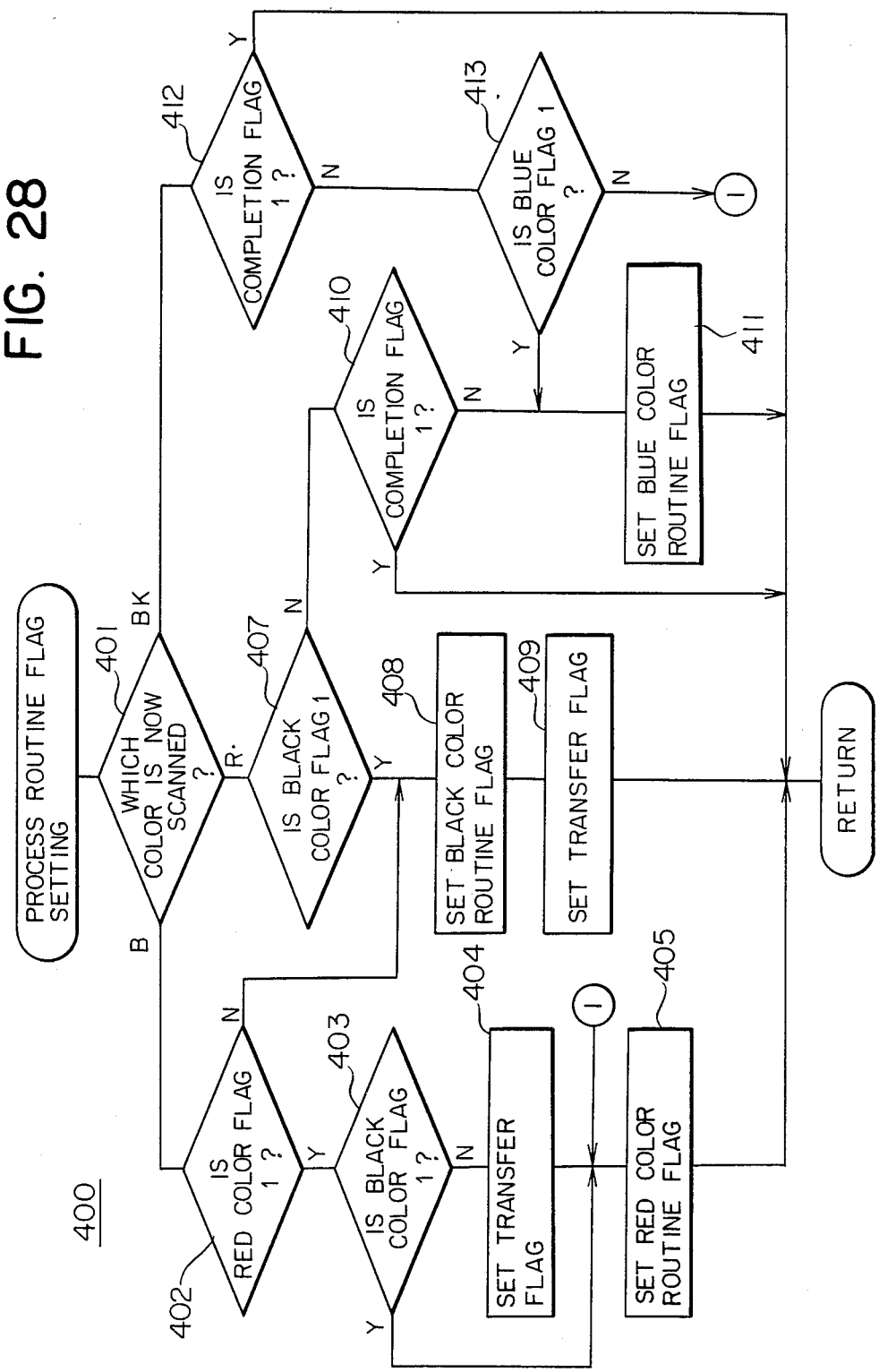

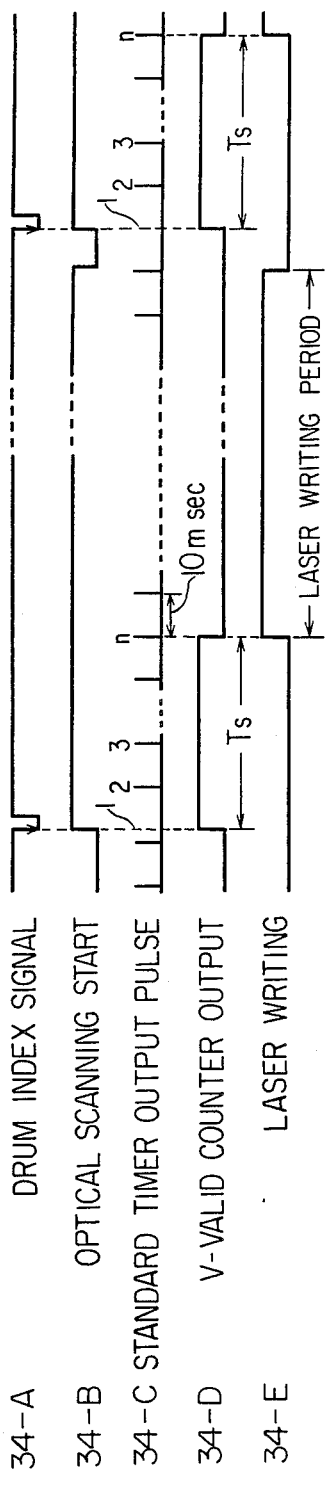
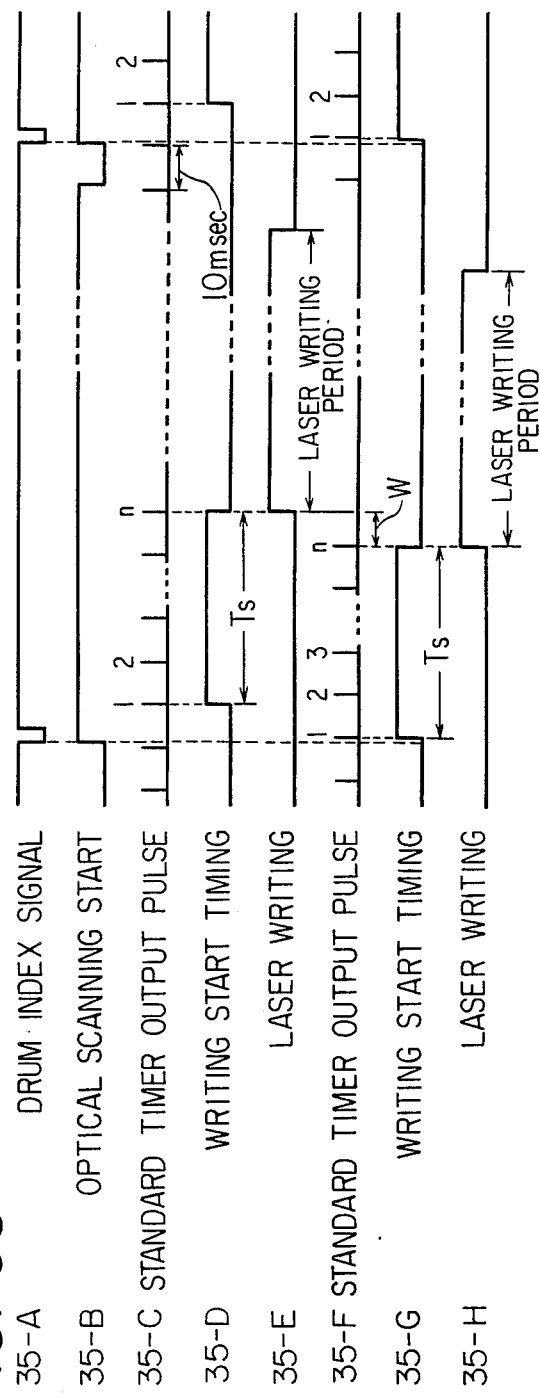
FIG. 34
34-A DRUM INDEX SIGNAL
34-B OPTICAL SCANNING START
34-C STANDARD TIMER OUTPUT PULSE
34-D V-VALID COUNTER OUTPUT
34-E LASER WRITING
FIG. 35
35-A DRUM INDEX SIGNAL
35-B OPTICAL SCANNING START
35-C STANDARD TIMER OUTPUT PULSE
35-D WRITING START TIMING
35-E LASER WRITING
35-F STANDARD TIMER OUTPUT PULSE
35-G WRITING START TIMING
35-H LASER WRITING

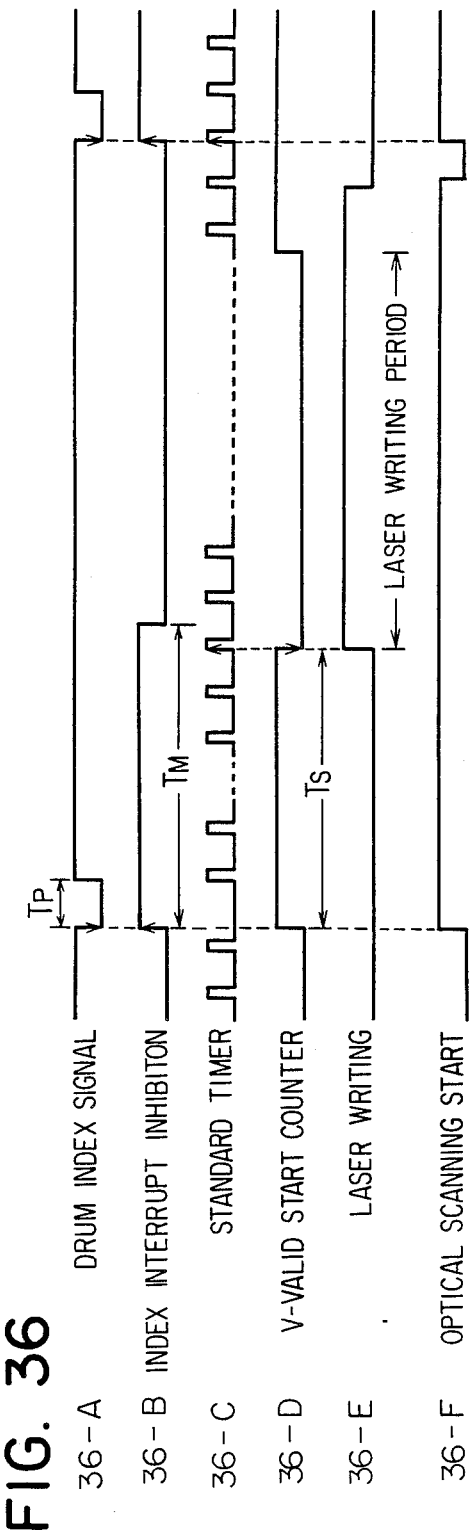
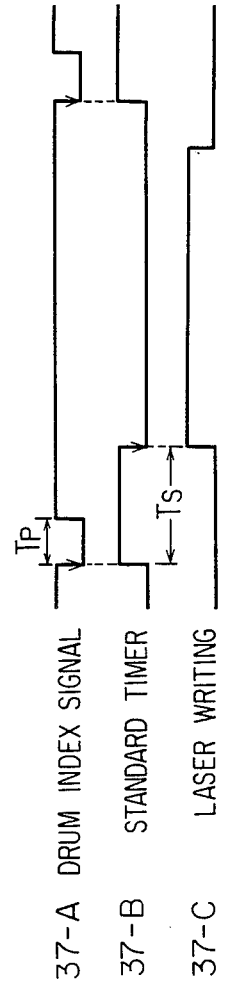
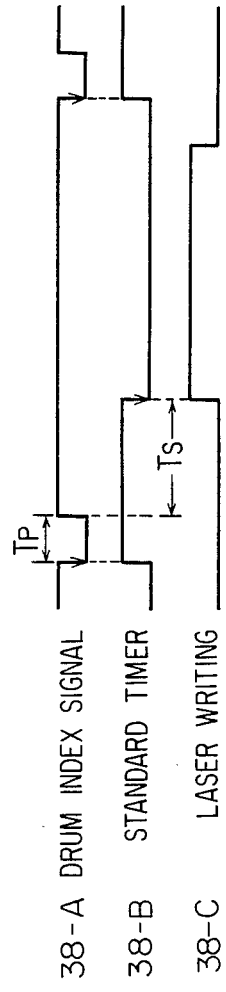
FIG. 36
36-A DRUM INDEX SIGNAL
36-B INDEX INTERRUPT INHIBITON
36-C STANDARD TIMER
36-D V-VALID START COUNTER
36-E LASER WRITING
36-F OPTICAL SCANNING START
FIG. 37
37-A DRUM INDEX SIGNAL
37-B STANDARD TIMER
37-C LASER WRITING
FIG. 38
38-A DRUM INDEX SIGNAL
38-B STANDARD TIMER
38-C LASER WRITING

COLOR IMAGE PROCESSING APPARATUS WHICH ACCURATELY REGISTERS MULTIPLE COLOR IMAGES BY COUNTING PULSES FROM A TIMER RESET BY A DRUM INDEX SIGNAL

FIELD OF THE INVENTION

The present invention relates to a color image processing system applicable to a simple electrophotographic color copying apparatus or the like.

In the field of image processing systems such as electrophotographic copying apparatus, the types capable of recording the color image tend to increase, since the recent market demand, especially in the office automation market, acceleratingly shifts to the color copying apparatus. Due to the rapid progress in the electronics, the recording of color image is usually controlled by the microcomputers.

Unlike the conventional monochrome image processing, the color image processing system being capable of duplicating a color image requires multiple steps of imaging operation, and requires a large and complicated system configuration.

Naturally, in recording color image, a single step of imaging process may not duplicate a full color image. Correspondingly, a color image as a duplicate of original color image may be recorded only by using several steps of processing. Accordingly, when a color image is recorded by a plurality of processing steps, a problem occurs; the registration of independent color images corresponding to the several color developing steps. This is because that poor registration cannot provide a sharply recorded color image.

When a copying apparatus has a color-image capable function, it should be constituted so as to enable the recording with a specific color which a user may arbitrarily select.

In this way, despite of the increasing need for the color recording, there are many disadvantages which must be solved.

At the same time, even with office documents usually processed with a conventional monochromatic copying apparatus, especially with the originals principally composed of line drawings, a trend for color copying is apparent, in particular, for highlighting a specified portion with an arbitrarily specified color, or for color duplication of graphs or tables.

The line drawings, graphs or the like, in such a multicolor original document should be reproduced with extreme fidelity. Accordingly, instead of the above-mentioned image processing device in compliance with the full-color image recording system, which does not readily reproduce the original line drawings, the advent of a color image processing system being capable of accommodating to the above-mentioned applications has been long awaited.

Even with the latter device, various problems should be solved in order to enable wider use. Accordingly, such a device should have improved registration, recording with an arbitrarily selected color, miniaturized and simplified device constitution, and improved cost-effectiveness. However, a device completely satisfying these requirements has not yet developed.

Therefore, it is an object of the invention, for solving such problems, to provide a color image processing system, which though having a miniaturized and simplified system constitution, is capable of recording a color image without deteriorating the quality of duplicated color image.

As mentioned previously, when recording a color image, the color image processing system, such as an electrophotographic copying device, at first separates a color original document into a plurality of independent color images, then each of the independent color images is transferred, by means of signals corresponding to the plurality of independent images, onto an image-forming member in order to form corresponding electrostatic latent images, which are transferred and fixed after the developing steps for all the color images have completed, thus finally recording (copying) a color image which is the duplicate of original color document.

The color image processing system being capable of such type of color recording inevitably requires an image forming member which rotates a plural times in order to record a color image which is coded into the corresponding types of color signals. With such an arrangement, however, the exact alignment of a preceding developed latent image and a next latent image being developed is indispensable.

This is because, if the initial writing position of a preceding developed latent image even slightly differs from the similar position of a next latent image being developed, the resultant misalignment in color images inevitably deteriorates the quality of recorded color image.

For this reason, the registration correction in relation to the recording colors is extremely important. The reason for decreased precision in registration is because the relation between the leading edge of original document and the initial position in a rotation of drum varies every time the image signal is written. Accordingly, correcting the registration is effected by establishing the constant relation between the writing timing and the rotational position of a drum.

To correct the rotation, the following method may be available.

To drive a rotating drum serving as an image forming member, a color image processing system has a drum driving circuit mounted on the drum and controlled by a PLL. In the drum driving circuit, a drum controlling command signal transmitted from a controller comprising a controller microcomputer is supplied to an encoder provided within the driving circuit, whereby the drum driving motor (main motor) is controlled by the output from the encoder.

Correspondingly, the above-mentioned problem is solved by using the clock signal also to control the registration, and by using the encoder as a sequence controlling encoder, and by counting, in synchronization with the clock signal, the pulses corresponding to one rotational sequence of the drum, so as to correctly align the leading edge of independent color image based on the number of counted pulses.

When counting the pulses corresponding to one rotational sequence of the drum, as mentioned above, by using the clock signal of encoder, o serious problems will occur as far as the ratio between the one rotational sequence of the drum and the number of pulses counted by the encoder when expressed by an integer.

However, the ratio between the one rotational sequence of the drum and the number of pulses counted by the encoder is in many cases not expressed by an integer, because the clock frequency of the encoder is predetermined to controllingly drive the main motor.

When there is not such an integer-definable relation, and if the clock signal of encoder is used as a signal for detecting the rotational status of drum, one rotational sequence of the drum is not counted by using an integer number of encoder pulses. Correspondingly, when the drum is turned for the number of times corresponding to the number of independent color images to superpose one image on the other image, the leading edges of the independent images deviate from the similar edges of the other images, because the errors due to the non-integer-definable relation are accumulated and the initial rotational position of the drum eventually deviates from that of a preceding rotation. In short, the registration deteriorates in proportion to the increase in number of drum rotations which is necessary to record a color image which may be separated into the several number of independent color images.

Additionally, even if the main motor rotates at a constant speed, the load on drum greatly fluctuates, because a cleaning blade and a cleaning roller are repeatedly pressed upon and released from the drum. Such fluctuation in load in turn causes the minor fluctuation in the drum speed.

Naturally, such small load fluctuation also deteriorates the registration.

In view of these problems, the object of the invention is to solve such problems, and, therefore, the invention proposes a color image processing system featuring excellent registration, and, accordingly, improved quality of color image.

According to the invention, the above-mentioned disadvantages are solved in the following manner; the drum rotation signal (hereinafter referred to as drum index signal) is formed, then based on the drum index signal the writing timing of a laser is controlled. This always enables the rotational position of the drum to coincide with the writing timing of a laser, thus greatly improving the registration.

With such a color image processing system, an optical scanning system is necessarily activated in synchronization with the rotation of the drum, and, simultaneously, the other image processing steps are necessarily started in synchronization with the activation of the optical scanning system. Accordingly, a drum index element to detect the rotational position of the drum is provided and connected to the drum, as well, a reference timer providing reference points in time axis is provided so as to detect the writing timing for image signal. The processing steps including the activation of the optical system are effected based on the index interruption processing.

The timing correlation among the drum index, reference timer or standard timer and the image writing of optical system is hereinunder described with the reference to FIG. 35.

Firstly, the drum index signal is generated, which activates the optical scanning system, immediately initiating the optical scanning (the scanning for image reading) (FIGS. 35-A and 35-B).

At the same time, using 10 msec reference timer, a specific number of pulses is counted after the drum index signal is detected. This causes the stand-by period TS of the optical scanning system (FIGS. 35-C and 35-D). The stand-by period TS is a period necessary for the optical scanning system to start and reach the leading edge of an original document to be read. The stand-by period TS is always constant, regardless of the size of the original. At the end of the stand-by period, the writing of image data onto the drum begins (see FIG. 37-E).

In this way, by using the drum index signal, and by starting the count of the reference timer pulses at a time point when the drum index signal is detected, the stand-by period TS of the optical scanning system can be determined. Performing such a processing step every time the drum turns can always maintain the image data writing timing constant, and thus improving the registration.

However, when maintaining the image data writing timing always constant, as mentioned above, by detecting the drum index signal so as to start the reference timer, the writing timing may deviate by one pulse phase of the reference timer, depending upon a manner with which the drum index signal is being interrupted.

For example, as shown in the FIGS. 35-A through -C, the drum index signal interrupt may occur immediately after the pulse of reference timer has been outputted. Also, as illustrated in FIGS. 35-A, -F and -G, the drum index signal interrupt may occur immediately before the similar pulse is outputted.

The count of stand-by period TS starts when the drum index signal is received. Accordingly, even if the interrupt timing of drum index signal deviates, as mentioned above, one pulse cycle forward or backward, the duration of stand-by period TS is always constant.

However, the termination timing of the stand-by period TS naturally differs, depending upon the interrupt timing of the drum index signal. The start timing for writing the image data is based on the termination timing of the stand-by period TS. Therefore, in this case, the writing timing deviates by one cycle W of the reference timer at the maximum.

When using 10 msec reference timer, the writing timing deviates, in the worst case, approximately 10 msec, depending upon the manner of drum index signal interruption. In this case, the leading edge of an independent color image may deviate by approximately 0.57 mm.

Additionally, if the deviated leading edge of image is written into the data processing system, the deviation affects the leading edge through the trailing edge of the image, when the image is recorded (copied), without the error being compensated. This means to provide a recorded image featuring excellent registration becomes too difficult.

Accordingly, the invention has solved such disadvantages, and proposes a color image processing system featuring an improved quality of recorded color image, by incorporating an arrangement, wherein the image data writing timing is always maintained constant even if the image data writing timing is determined based on the drum index signal.

Incidentally, a series of processing steps including one where the data writing with a laser is initiated upon the detection of the drum index signal are, in most cases, controlled by a microcomputer.

When controlling writing timing and other steps with a microcomputer, the drum index signal detected on the drum is temporarily fed into the microcomputer, whereby the index signal activates the interrupt routine.

At the same time, the microcomputer where the index signal is fed may have in its input stage a high-gain amplifier serving as a buffer.

The provision of such a high-gain amplifier may result in the activation of the interrupt routine being triggered not only by an normal index signal but by noise.

The noise-triggered erroneous activation of interrupt routine makes it impossible to regulate the correlation between the rotational position of drum and the data writing timing with a laser within a specific allowable scope, based on the index signal.

For example, the interference by noise will cause the erroneous operation illustrated in FIGS. 37 and 38, if a control program is designed so that the reference timer (FIG. 37-B) designating the data writing timing with a laser in synchronization with the fall of index signal (FIG. 37-A) is generated, and that the data writing with a laser is performed when a specific number of pulses have been counted (period Ts) based on the reference timer.

More specifically, when not only a fall but a rise in index signal can set the reference timer, a second pulse will reset the reference timer, and the counting sequence restarts at this time point (FIG. 38-B).

As a result, the writing start timing with a laser delays, from the normal timing, at least a period corresponding to the pulse duration Tp of the index signal (FIG. 38-C).

Accordingly, the invention has solved such disadvantages, and proposes a color image processing system featuring satisfactory registration and, as a result, an improved quality of recorded color image, by incorporating an arrangement to prevent the interrupt routine from being erroneously activated by an external noise even if the drum index signal is used for the above purpose.

Some of the color image processing systems being capable of the above-mentioned color recording operation are provided with two types of copy modes; the mono-color copy mode and the multi-color copy mode.

The mono-color copy mode is a mode, wherein an image is recorded in a specified color with one rotation of an image forming member.

In contrast, in the multi-color copy mode, a color image is recorded in two or three colors. Accordingly, an image is recorded in the specific colors only when an image forming member has completed two or three rotations. Such a color mode may be hereinafter referred to also as a two- or three-color copy mode.

As can be understood from the above description, in the multi-color copy mode, it is necessary to turns the image forming member a plurality of times in compliance with the plurality of independent color signals. In this case, a latent image to be developed should, as mentioned previously, exactly align with an already developed latent image.

For this purpose, in the multi-color copy mode, the initial image-writing position is every time allowed to correspond with a specific position, by means of the above-mentioned index signal.

In contrast, in the mono-color copy mode, it is not necessary to adjust the initial writing position to a specific position. If a continuous copying operation is performed with this mode, it is advantageous to initiate the next copying sequence, without waiting for the completion of one rotation of the drum, immediately after the completion of image writing, because this arrangement expedites the continuous copying operation.

However, if the start of writing is controlled based on the index signal, the copying rate becomes low, since the writing should be always resumed at the first initial image-writing position.

This is simply because only one type of reference signal (index signal) is used regardless of copy mode.

Accordingly, the invention has solved such disadvantages by providing a color image processing system, wherein the above disadvantages are eliminated by selecting a reference signal to designate the initial image-writing position in accordance with a copy mode.

SUMMARY OF THE INVENTION

According to the invention, the above-mentioned problems are solved by a color image processing system:

Wherein the color image signal being photoelectrically converted from color image information by an image reading means is further converted into optical signal so as to form a electrostatic latent image on an image forming member, and the latent image is developed so as to record th original color image information, and;

comprising a color signal generation means to separate the color image signal transmitted from the image reading means into specific independent color component signals, an output device in which the optical signal is modulated based on these independent color component signals, a latent image forming means to form the electrostatic latent imaged based on the optical signal transmitted from the output device, and a plurality of developing means each of which can be adapted to correspondingly develop each independent electrostatic latent image based on the independent color component signal.

The above-mentioned system is provided with a plurality of developing means each of which can sequentially develop each independent electrostatic latent image based on the independent color component signal separated from the color image signal, and at the same time, the starting timing with which the image is written onto the image forming member based on the drum index signal which is available in synchronization with the rotation of the image forming member.

With the above-mentioned system, the drum index interruption is inhibited for a specific period after the drum index signal obtainable in synchronization with the rotation of the image forming member is obtained.

With the above-mentioned system, every time the drum index signal obtainable in synchronization with the rotation of the image forming member is outputted, the reference timer to form the signal for starting the image signal writing restarts in synchronization with the drum index signal.

The above-mentioned system comprises a motor driving an image forming member, a means detecting the drum index and mounted on the image forming member, a means generating encoder signal and connected to the motor for driving the image member, and characterized in that, in compliance with a designated copy mode, the drum index signal or the encoder signal is used as the reference signal for the image writing.

In the color image processing system of the invention having the above-mentioned constitution, the color image information is read and converted into color image signal (electrical signal) by an image reading means (photoelectric conversion means) such as a CCD. The color image signal is separated into a plurality of independent color component signals (in the example embodying the invention, three colors; red, blue and black) by a color signal generating means. Each of the independent color component signals is converted into a binary-coded signal comprising "1"s and "0"s by a binary circuit.

The binary-coded signal modulates the output device, which is a device to form an optical signal corresponding to the binary-coded signal. Writing the optical signal onto the image forming member having a uniformly electrified photosensitive layer forms an electrostatic latent image.

An electrostatic latent image is formed for each of the independent color component signals, and accordingly, multicolor recording requires at least three color image forming sequences.

Each independent electrostatic latent image is developed by a corresponding developing unit, then subjected to the fixing which completes the color imaging process.

Additionally, a cleaning means cleans the surface of the image forming member in order to prepare the next imaging sequence.

By controlling the image signal generating means, the color component signal transmitted to the binary-coding circuit is designated. This allows recording a read-out image in a externally designated color.

The timing for writing an electrostatic latent image, that is, the timing for writing the color component signal, is regulated based on the index signal obtainable from the drum. The above writing timing is reset every time the independent color component signal is written. This arrangement prevents the deterioration of registration even when a plurality of independent color component images are superposed upon one another to record a color image. Also, the similar timing does not deviates even if the load exerted upon the drum fluctuates.

The reference timer restarts its cycle upon the reception of the drum index signal. This arrangement ensures, regardless of the interrupt timing of the drum index signal, that the termination timing of the stand-by period TS corresponds with a specific time point. As a result, the registration does not deteriorate even when a plurality of independent color component images are superposed upon one another to record a color image.

Since the interruption of following index signal is inhibited for a specific period after the reception of the similar signal, the control routine of a microcomputer is not accidentally activated by an external noise, even if the microcomputer has a high-gain amplifier.

Using an independent color component signal having been already separated, an electrostatic latent image of the corresponding color is formed. In other words, the writing timing for an independent electrostatic latent image, that is, the writing timing for an independent color component signal, is determined in compliance with a color copy mode.

As a reference signal for the write start position, an encoder signal is used in addition to the index signal obtainable from the drum. As an encoder signal, a signal transmitted from, for example, a frequency generator (FG) connected to the motor for driving the drum is used.

The encoder signal provides n steps of pulses per one rotation of the drum. Correspondingly, by referring to the pulses, a specific position of the external circumferential surface is arbitrarily and readily designated. This arrangement eliminates a necessity to hold a next copying sequence until the completion of one rotation of the drum, and greatly accelerates the overall copying operation.

For this reason, the encoder signal is sued as a reference signal in the mono-color copy mode. In contrast, during the multi-color copy mode, the index signal is used as a reference signal.

BRIEF DESCRIPTION OF THE DRAWING

FIG. 5 is a block diagram illustrating an example constitution of an image reading device;

FIG. 6 illustrates the correlation among various processing timing and describes the image reading operation;

FIG. 7 explains an optical scanning system;

FIG. 11-B illustrates one example of a color selection circuit;

FIGS. 12 and 13 are waveform diagrams independently illustrate the correlation between a color signal and the recording operation thereof;

FIGS. 25 through 33 are flowcharts jointly illustrate one example of control program controlled by the first and second microcomputers;

FIG. 34 indicates waveform diagrams illustrating the operation according to the invention;

FIG. 35 indicates waveform diagrams illustrating the malfunction of a counter;

FIG. 36 represents waveform diagrams illustrating the improved operation according to the invention;

FIGS. 37 and 38 are waveform diagram jointly illustrating the malfunction of a counter;

DETAILED DESCRIPTION OF THE INVENTION

Figure 1:
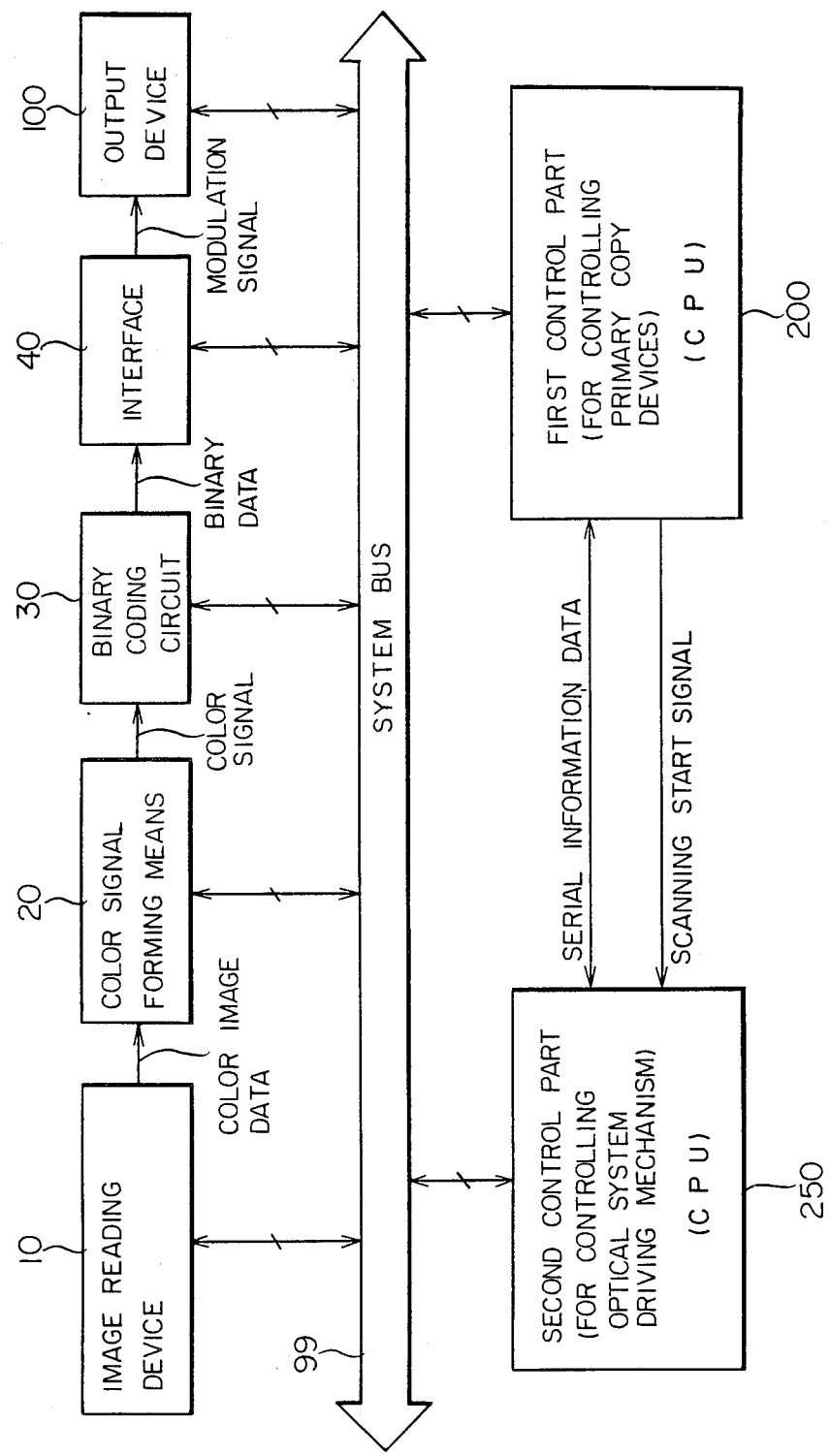
FIG. 1 is a block diagram schematically illustrates the system constitution of a color image processing system of the invention.

One example of a color image processing system of the invention is hereinunder described in detail with the reference to FIG. 1 onwards.

FIG. 1 schematically illustrates a color image processing system according to the invention.

Color information, for example, of an original document is converted into color image signal at an image reading device 10. After the analog-to-digital conversion and other image processing steps, the signal is finally converted into image data having a specific bit configuration, for example, the configuration comprising 16 tones (represented by hexadecimal 0 through F).

The image data is separated into a plurality of independent color signals at a color signal forming means 20. In this example, a plurality of independent color signals correspond with three colors, or more specifically, red signal, blue signal and black signal are used. Naturally, it may be readily understood that the image data may be separated into signals of other colors.

All of the independent color signals are sequentially binary-coded at a binary coding circuit 30. In this example, the similar signals are converted into binary dither data by means of a dither matrix having specific threshold values, or by another means.

The dither image is fed into an output device via an interface circuit 40. The interface circuit 40 controls the output status of the dither image as well as the outward transmission of a test pattern.

A laser recording device or the like is used as the output device 100. With such a laser recording device, the dither image is converted into a specific photo signal, which is modulated based on the binary data of the dither image. In this example, the signal modulation is effected by internal modulation. However, external modulation ma substitute the internal modulation without causing any adverse effects.

The optical signals transmitted from the output device 100 correspondingly form independent electrostatic latent images respectively in an independent color. The latent images are then subjected to the fixing, thus a color image is recorded on a recording paper as required.

The above-mentioned image reading device 10 through the output device 100 are controlled, based on the command signals transmitted respectively from two controllers 200 and 250, in controllers 200 and 250 independently comprise a microcomputer.

The first controller 200 controls the image processing system as a whole. The second computer primarily controls peripheral devices provided for image reading operation. The reference numeral 99 represents a system bus to transmit various command signals for such controlling functions.

In addition to the transmission of the above-mentioned various command signals, the first and second controllers 200 and 250 control, in accordance with a predetermined sequence, various hardware for the image reading operation, as well as a color copying machine associated with the output device 100.

Next, a typical example of such a color image processing system is described below.

Figure 2:
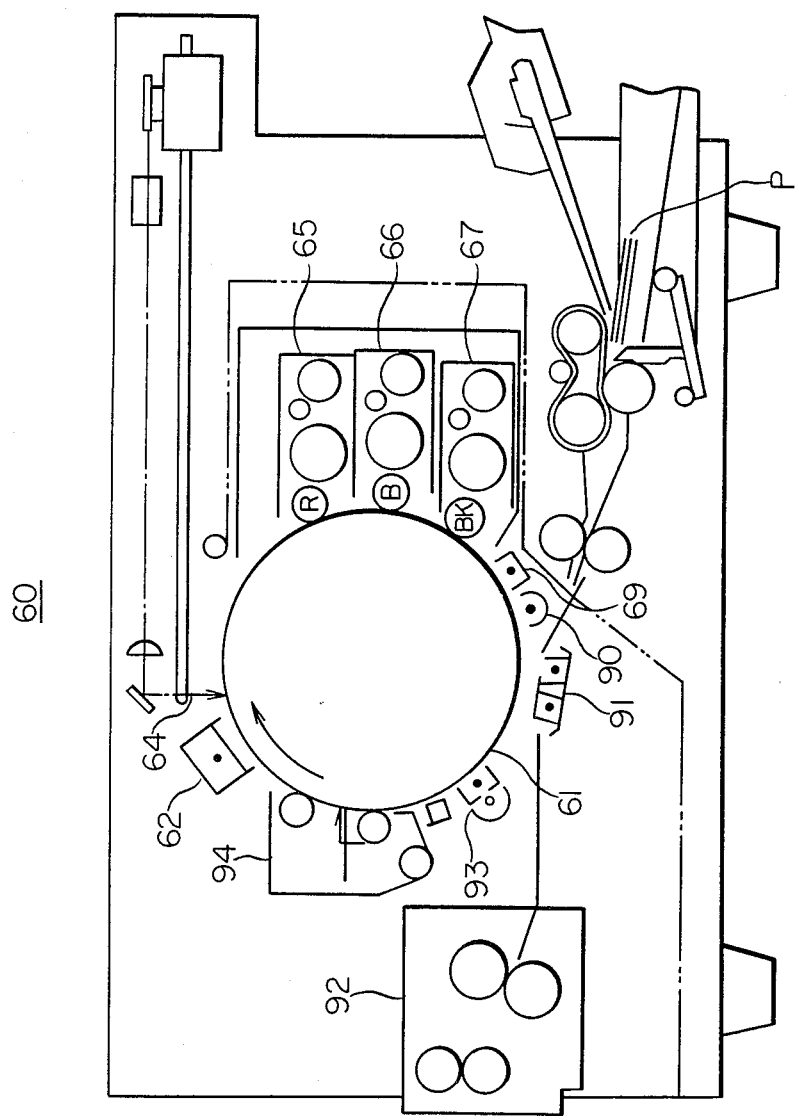
FIG. 2 is a cross-sectional diagram illustrating the principal area of one example color photocopying machine useful for the invention.

At first, a simple color copying machine useful in the invention is described with the reference to FIG. 2 onwards.

A simple color copying machine records a color image while the color information is separated into about three types of independent color information. The three types of independent color information are, in this example, black BK, red R, and blue B.

In FIG. 2, the reference numeral 60 represents one example of the principal area of a color copying machine. The numeral 61 represent a drum-shaped image forming member whose surface has an photoconductive surface layer composed of OPC (organic photoconductive member) or the like, where an electrostatic image (electrostatic latent image) in correspondence with an optical image is formed.

Opposing to the circumferential outer surface of the image forming member 61 are sequentially disposed, along the rotational direction, the members mentioned below.

The surface of image forming member 61 is uniformly electrified with an electrifier 62. On the uniformly electrified surface of image forming member 61, each independent color image is subjected to the imagewise exposing (the optical image is represented by the reference numeral 64). The image having been subjected to the imagewise exposing is developed with a corresponding developing unit. The number of developing units corresponds to the number of independent color images.

In this example, a developing unit 65 containing red toner-developer, a developing unit 66 containing blue toner-developer, and a developing unit 67 containing black toner-developer, are disposed in this order in the direction of rotation of the image forming member 61 as opposed to the surface of the member 61.

One of the developing units 65 through 67 is selectively driven in synchronization with the rotation of the image forming member 61. For example, when the developing unit 67 is driven, the toner deposits on the electrostatic latent image corresponding to an independent black image, thus developing a positive independent black image.

Toward the developing unit 67 are provided a pre-transfer electrifier 69 and a pre-transfer exposure lamp 90. This arrangement allows smooth transfer of a color image on a recording member P as well as smooth separation of the recording member from the image forming member 61.

The pre-transfer electrifier 69 and the pre-transfer exposure lamp 90 are provided in compliance with a specific requirement.

The color image developed on the image forming member 61 is transferred onto the recording member P by a transferrer 91. The recording member P having the transferred image is subjected to a fixing device 92 in the after-stage, then the recording member, or a recording paper, is ejected.

A neutralizing device 93 comprises, in compliance with a requirement, one or both of a neutralizing lamp and a neutralizing corona discharger.

A cleaning device 94 comprises a cleaning blade, magnetic brush, fur brush and the like. These components function to remove residue toner on the drum surface after a color image on the image forming member 61 is transferred.

It is well known that the cleaning means for removal operation is well apart from the surface of image forming member 61 until the already developed portion of the member reaches and passes through the area of the similar means.

As the electrifier 62, a scorotron corona discharger or the like may be used. This is because such an arrangement, with limited influence from a former electrification step, provides stable triboelectricity on the image forming member 61 and ensures a specific level of surface potential.

Figure 3:
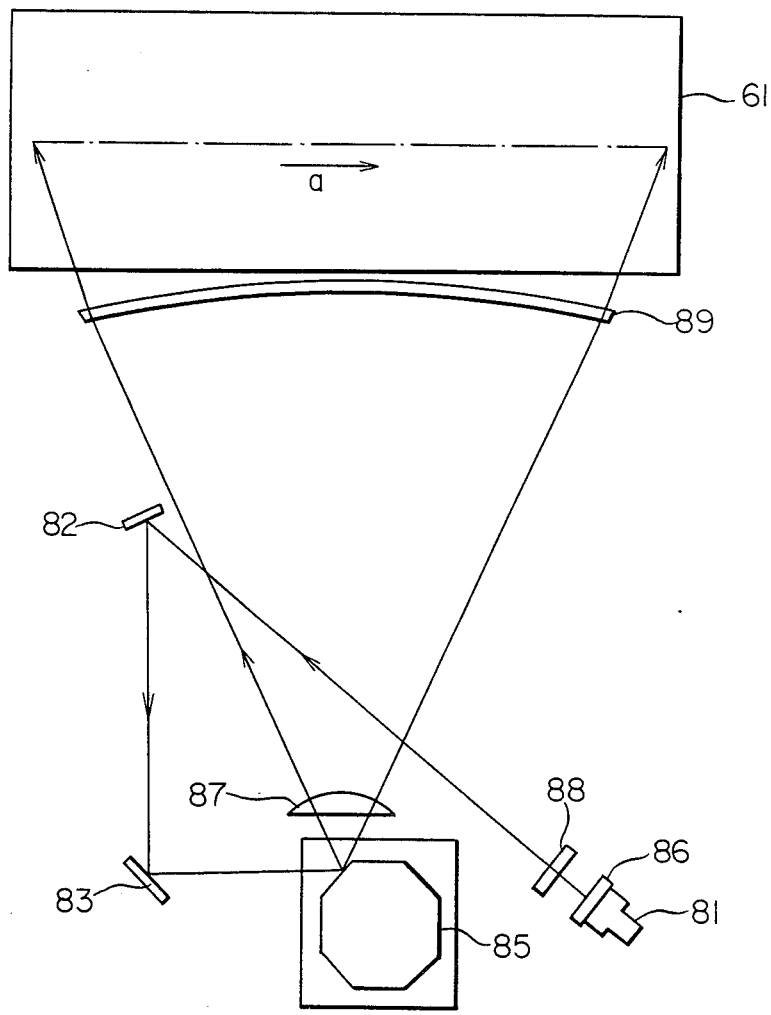
FIG. 3 is a schematic diagram illustrating a preferred output device used in the invention.

As the image exposure light, an image exposure light generated by a laser beam scanner is employed. A laser beam scanner allows, as mentioned below, a well-defined color image to be recorded. An image exposure means in FIG. 3 is one example of the laser beam scanner (optical scanning device) 80.

The laser beam scanner 80 has a laser 81 such as of a semiconductor laser. The laser 81 is controllingly turned ON or OFF by independent color images (for example, in the form of binary-coded data). A laser beam emitted from the laser 81 reaches a mirror scanner 85 comprising an octahedral rotating polygon mirror via mirrors 82 and 83. The laser beam is deflected by the mirror scanner 85 and directed onto the surface of the image forming member 61 through a image-focusing f-θ lens 87.

The numerals 88 and 89 represent tilt angle correcting cylindrical lenses.

The laser beam being continuously deflected by the mirror scanner 85 scans the surface of the image forming member 61 in a specific direction with a specific speed. Such scanning enables image exposing corresponding to an independent color image.

A collimator lens 86 functions to set the beam diameter on the image forming member 61 to a specific value.

As the mirror scanner 85, a galvano mirror, crystal deflector or the like may substitute for the rotating polygon mirror.

The developing units 65 through 67 have a substantially identical construction. Accordingly, the construction is hereinunder described by using the developing unit 65 as an example.

Figure 4:
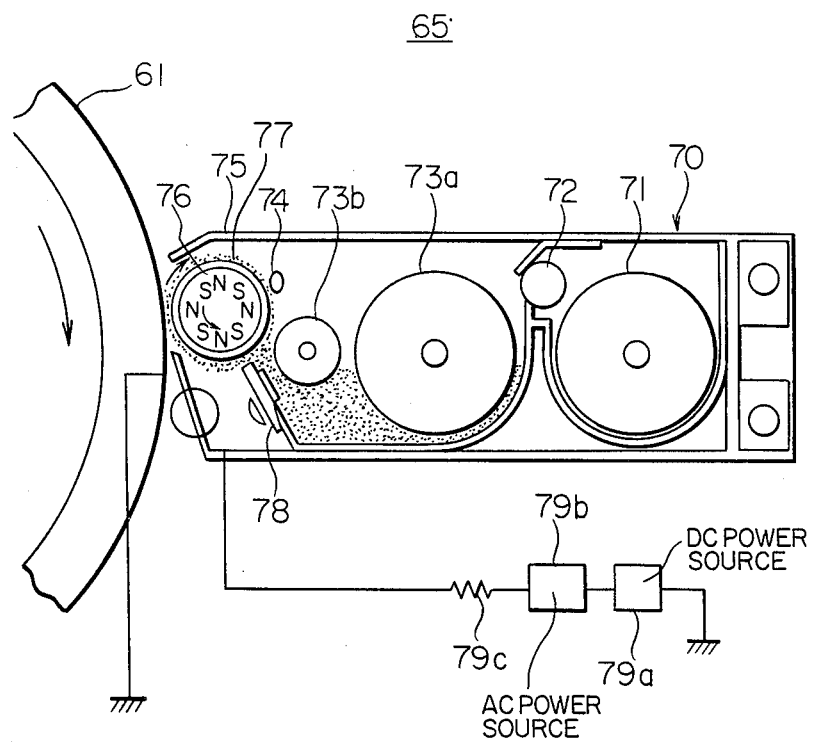
FIG. 4 is a cross-sectional diagram illustrating one example of an independent developing unit.

FIG. 4 illustrates one example of developing unit 65.

In this figure, the meanings of reference numerals are as follows: 70, housing; 71, toner supplier; 72, sponge roller; 73a and 73b, toner agitating members; 74, scraper; 75, developing sleeve; 76, magnet (roller-shaped development magnet); 78, H-cut plate; 79c, register; 79b, AC power source, and; 79a, DC power source.

The toner supplied from the toner supplier 71 is transferred to the developing portion comprising the developing sleeve 75 and the magnet 76 by the operation of the sponge roller 72 and the agitating members 73a and 73b. Upon the developing sleeve 75 is formed a developer layer 77, whose thickness being uniformly regulated by the cut plate 78, comprising toner and carrier. This developer layer develops a latent image formed on the surface of the image forming member 61.

After the developing, the developer remaining on the sleeve 75 is scraped off by the scraper 74.

The clockwise arrow indicates the transfer direction of the developer, and the counterclockwise arrow indicates the rotational direction of the magnet 76.

A specific level of AC current having been superposed upon DC signal is applied onto the developing sleeve 75 via the resistor 79c. Correspondingly, a specific level of development bias is applied between the developing sleeve 75 and the image forming member 61.

In the second developing onwards, in which course the independent color toner images including the second one are sequentially formed upon the first one, toner already deposited on the image forming member 61 by a preceding development should not be shifted from the original position. For this reason, the developing is favorably performed in accordance with the non-contact jumping development method.

FIG. 4 illustrates a developing unit which performs the developing in compliance with the non-contact jumping development method.

A preferred developer is a so-called two-component developer comprising non-magnetic toner and magnetic toner. This is because such two-component developer provide vivid colors, and it allows easy electrification control of toner.

The image reader 10 may have a constitution illustrated in FIG. 5.

In this figure, the color image information (optical image) of an original document 1 positioned on a draft deck 1A is separated into two independent color images by a dichroic mirror 2. In this example, the similar information is separated into a red R color image and a cyan Cy color image. Accordingly, a dichroic mirror 2 having a cutoff property around 600 nm is used. This makes the red component a transmitting light, and the cyan component a reflecting light.

The red R image and the cyan Cy image are supplied respectively into image reading means 3 and 4 independently comprising, for example, a CCD, where an image signal exclusively comprising the red R component and an image signal exclusively comprising the cyan Cy component are independently outputted.

FIG. 6 illustrates the correlation among the image signals R and Cy, and various timing signals necessary for correctly outputting the image, wherein the horizontal direction valid signal (H-VALID) (FIG. 6-C) corresponds with the maximum original-reading width W of the CCDs 3 and 4, the image signal R in FIG. 6-F as well as the image signal Cy in FIG. 6-G are read out in synchronization with the synchronizing clock signal CLK (FIG. 6-E).

These image signals R and Cy are supplied via an unshown normalizing circuit into the A/D converter 5, where being converted respectively into a digital signal having a specific bit configuration.

During the A/D conversion, the shading correction is also performed. For this purpose, a memory 6 for shading correction is provided. The memory 6 samples white image data corresponding to one line in a non-image reading area and stores the data, then used the data as data for shading correction. For this purpose, the shading correction data in the memory 6 are read out in synchronization with the clock signal of a CCD driving pulse generating circuit 7. The pulse generating circuit 7 is provided with a clock signal generator 8. The timing of the memory 6 is controlled by the index signal for starting scanning supplied to the pulse generating circuit 7 as well as by the control signal supplied from the second controller 250.

The digital color image signal is fed into a color separating circuit in the next stage, where separated into a plurality of independent color signals necessary for recording the color image.

The above example is a simple recording device, wherein a color image is recorded in the three colors, red R, blue B, and black BK. Accordingly, the color separating circuit 150 separates original color signal into three independent color signals, R, B, and BK. A specific example of color separation is described later.

The independent color signals R, B, and BK, are transmitted to a ghost canceler 9, which performs the ghost elimination operation so as to cancel the ghost signals possibly appearing both in the main and sub scanning directions.

Incidentally, as shown in FIG. 7, the main scanning line relative to the original document 1 is a lengthwise direction of the both CCDs 3 and 4 (horizontal scanning direction), and the sub-scanning direction means the shifting direction of the both CCDs 3 and 4 (vertical scanning direction).

After the elimination of any ghosts, the independent color signals R, B, and BK, are sequentially supplied into the color selecting circuit 160, whereby one specific color signal is selected per one rotation of the image forming member 61. This is because, as mentioned above, this example used an image forming process, wherein only one independent color image is developed per one rotation of the image forming member. More specifically, in synchronization with the rotation of the image forming member 61, the developing units 65 through 67 are sequentially and selectively driven, and simultaneously, the independent color signal corresponding to the selectively driven developing unit is sequentially selected at the color selecting circuit 160.

The color selection signals G1 through G3 corresponding to independent color signals are transmitted from the second controller (second microcomputer). The output status of the color selection signals G1 through G3 varies depending upon whether a recording mode is normal three-color copy mode or a mono-color recording mode, that is, color-designated recording mode.

Additionally, the color separation operation to separate an original color draft into three independent color signals is performed per every rotation of the image forming member 61.

The above color separation operation (color separation into two or three independent color signals) is performed based on the following principle.

Figure 8:
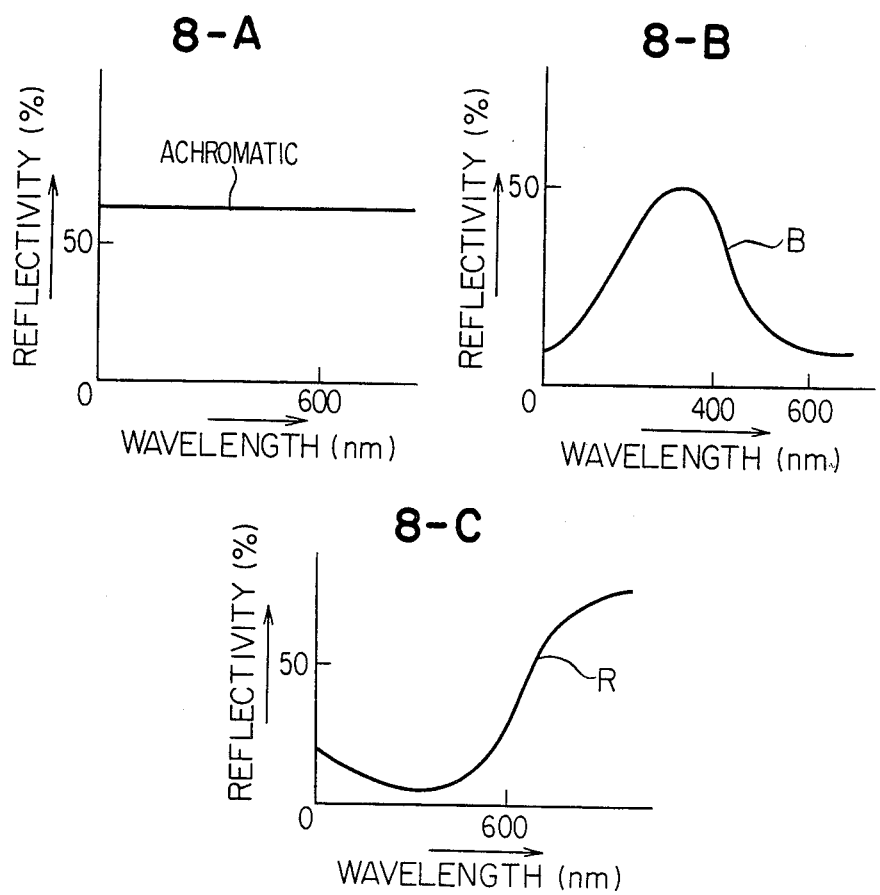
FIG. 8 includes spectral diagrams of a color signal.

FIG. 8 schematically illustrates the spectral reflectivity characteristics of a color chart of an independent color component, wherein FIG. 8-A illustrates the spectral reflectivity characteristics of achromatic component, FIG. 8-B illustrates the blue spectral reflectivity characteristics, and FIG. 8-C illustrates the red reflectivity characteristics. The horizontal axis represents wavelength in nm, and the vertical axis represents the relative sensitivity in %.

Now, assuming that the level of red signal R being normalized based on the white color is VR, and that the similar level of cyan signal Cy is VC, then, by formulating the coordinate system with the signals VR and VC, an original color image can be separated, based on the formulated color separation map, into red, blue, and black.

In determining the coordinate axes, the following criterion should be taken into consideration.

I. To enable the reproduction of half-tone, the concept of reflectivity (reflective density) of original document 1 comparable to the luminance signal among television signals is to be incorporated.

II. The concept of color difference (including hue, chroma or and the like) among red, cyan and the like is to be incorporated.

Accordingly, available luminance signal information (for example, 5-bit digital signal) and color difference signal information (similarly, 5-bit digital signal) are as follows.

$$\text{Luminance signal information} = VR + VC \tag{1}$$

wherein, $$0 \leq VR \leq 1.0 \tag{2}$$

$$0 \leq VC \leq 1.0 \tag{3}$$

$$0 \leq VR + VC \leq 2.0 \tag{4}$$

The sum of VR and VC (VR+VC) ranges from the black level (=0) to the white level (=2.0), therefore every color corresponds to a value ranging from 0 to 2.0.

$$VR/(VR + VC) \text{ or} \tag{5}$$

$$VC/(VR + VC)$$

In an achromatic mode, a proportion between red level VR and cyan level VC contained in the whole level (VR+VC) is constant. Accordingly, the proportion may be expressed as;

$$VR/(VR+VC) = VC/(VR+VC) = 0.5 \tag{6}$$

In contrast, in a chromatic mode, especially in red color mode;

$$0.5 < VR/(VR+VC) \leq 1.0 \tag{7}$$

$$0 \leq VC/(VR+VC) < 0.5 \tag{8}$$

In cyan color mode $$0 \leq VR/(VR+VC) < 0.5 \tag{9}$$

$$0.5 < VC/(VR+VC) \leq 1.0 \tag{10}$$

Accordingly, by using a coordinate system having two axes, (VR+CC) and VR (VR+VC), or (VR+VC) and VC/(VR+VC), the chromatic color (red color and cyan color) and the achromatic color is clearly separated only with a level comparison process.

Figure 9:
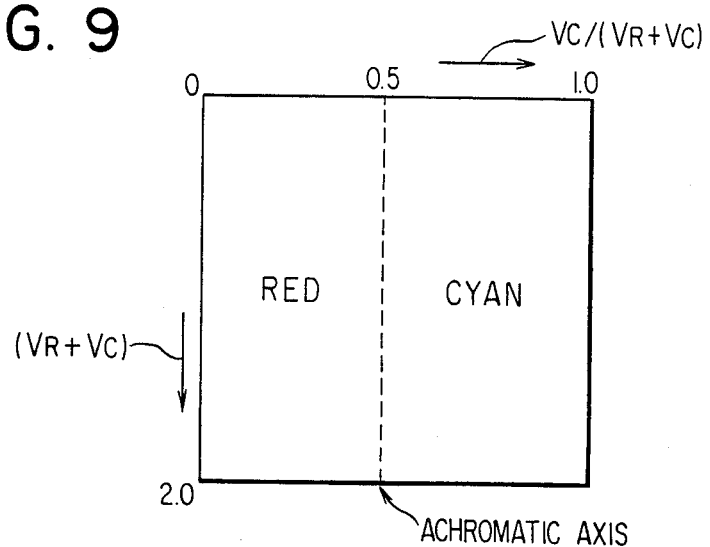
FIG. 9 explains the color separation procedure.

FIG. 9 shows a coordinate system, wherein the vertical axis corresponds with the luminance signal component (VR+VC), and the horizontal axis corresponds with the color difference signal component VC/(VR+VC).

When using VC/(VR+VC) to represent the level of a color difference signal component, and area lower than the level 0.5 is for the red color R, and an area greater than the level 0.5 is for the cyan color Cy. Achromatic color exists in the vicinity of the level 0.5 of the color difference signal information, as well as in an area containing less luminance signal information.

Figure 10:
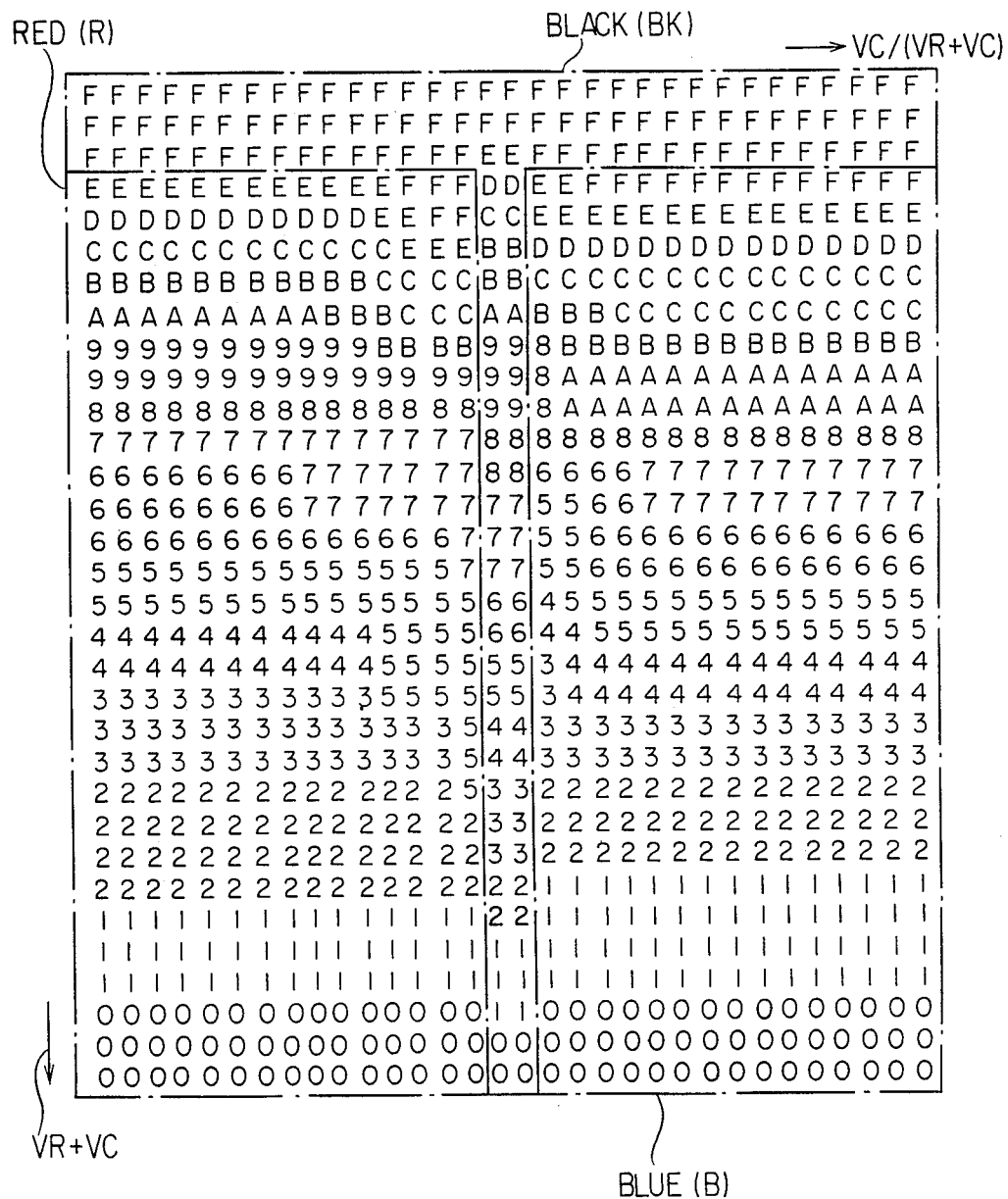
FIG. 10 illustrates one example of a color separation map.

FIG. 10 illustrates a typical example of color separation map, wherein the color separation has been effected in accordance with the above color separation method.

A ROM table is used as the color separation map. In this example, the map is subdivided into 32 by 32 blocks. Accordingly, as the number of address bits in relation to the ROM table, 5-bit line address as well as 5-bit column address are used. The ROM table stores quantified density-representing values obtained based on the reflective densities on an original document.

Figure 11A:
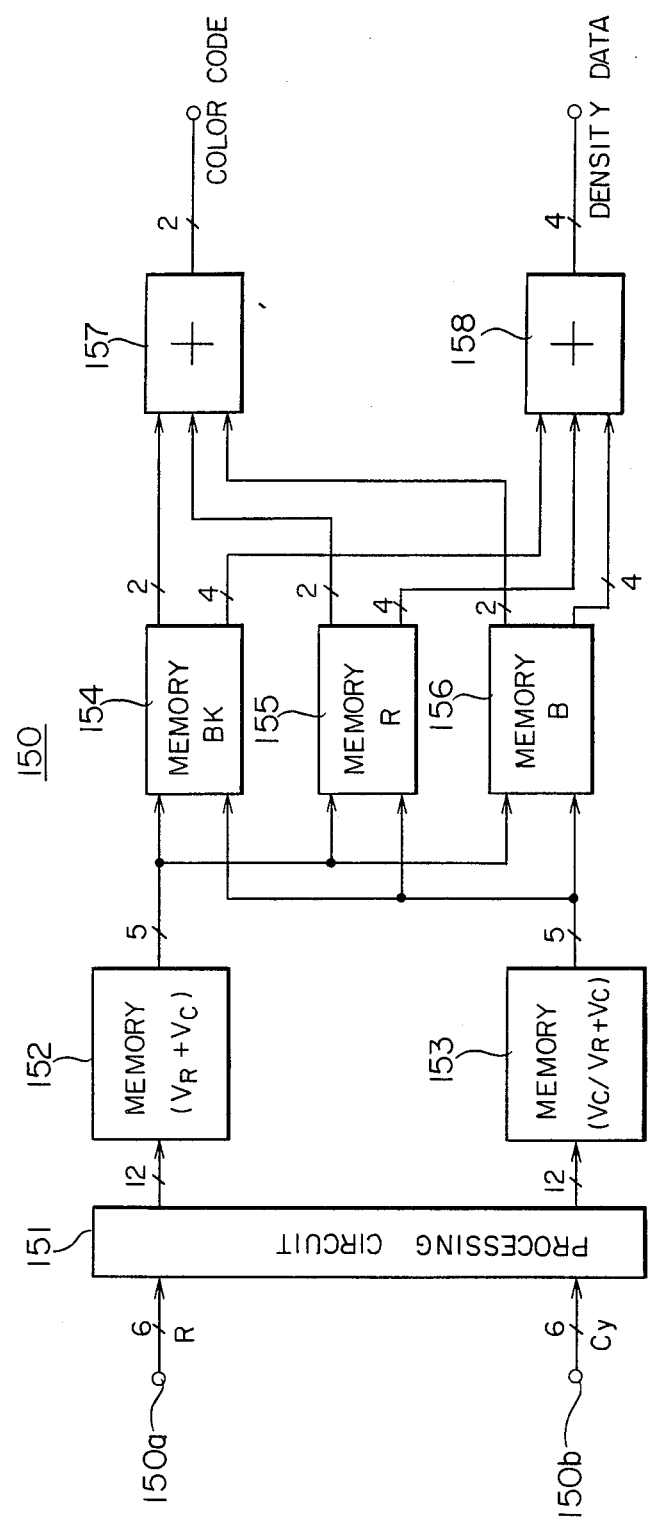
FIG. 11-A illustrates one example of a color separation circuit.

FIGS. 11-A and -B are schematic diagrams illustrating respectively one example of a color separating circuit 150 and one example of a color selecting circuit 150.

With the color separating circuit 150 in FIG. 11-A, into terminals 150a and 150b, the red signal R and the cyan signal Cy, prior to the separation into three colors, are respectively supplied, whereby the signals are subjected to various processing steps, such as tone conversion, y correction and the like, at an arithmetic processing circuit 151.

The arithmetically processed data is used as an address signal for a memory 152 storing the arithmetic results of (VR VC) necessary to formulate the luminance signal data, and at the same time, used as an address signal for a memory 153 storing the arithmetic results of color difference signal data VC/(VR+VC).

The outputs from the memories 152 and 153 are used as address signals for color separating memories (each comprising a ROM) 154 through 156. As the memories 154 through 156, the data tables individually storing the data of independent color separation map, shown in FIG. 10, are used.

The memory 154 is associated with the black signal BK, and the memory 155 is associated with the red signal R, and the memory 156 is associated with the blue signal B.

As can be understood from the color separation map in FIG. 10, it is possible to separate the color information signal of an original color draft into three independent color signals R, B and BK, and output these signals, by detecting the levels of red signal R and cyan signal Cy.

Each of the memories 154 through 156 simultaneously outputs the density data (4-bit configured) of corresponding color signal as well as 2-bit configured color code data.

The independent density data as well as the independent color-code data are synthesized into one entity correspondingly in the after-stage synthesizers 157 and 158. The synthetic density data as well as the synthetic color code data are supplied into the ghost canceler 9, where the ghost signals are eliminated.

After the ghost elimination, the data is fed into the color selecting circuit 160 illustrated in FIG. 11-B.

Having been supplied into the terminal 161, the color code data is further supplied into a decoder 164, where the color code is decoded, and the decoded output is supplied into OR gates 166 through 169. Likewise, data of the color selecting signals G1 through G3 having been supplied into the terminal 163 are decoded by a decoder 164, which supplies the decoded outputs into a plurality of above OR gates 166 through 169, an appropriate color signal is arbitrarily selected from the red, blue and black color signal, and a signal involving all these color elements (all-color).

The color signal-selection signal outputted from each of the OR gates 166 through 169 is supplied into the density signal separating circuit 170 as a density selecting signal. Into the density signal separating circuit 170 is supplied the above-mentioned density data via the terminal 162, and appropriate density data is selected in correspondence with the above-mentioned selection signal.

The selected density data is supplied into a binary-coding circuit 30.

The color selection signals G1 through G3 correspond respectively with each separated color signal; in an ordinary color recording mode, the gate signals G1 through G3 constitute a three-phase signal in synchronization with the rotations of the image forming member 61 (FIGS. 12-G through I). Simultaneously, into each of the developing units 65 through 67 is supplied a corresponding development bias represented by one of FIGS. 12-C through 12-E in synchronization with the rotation of the image forming member 61.

As a result, in correspondence with the exposure processes I through III (FIG. 12-F) each for an independent color, the exposing and developing are performed sequentially.

Figure 13:
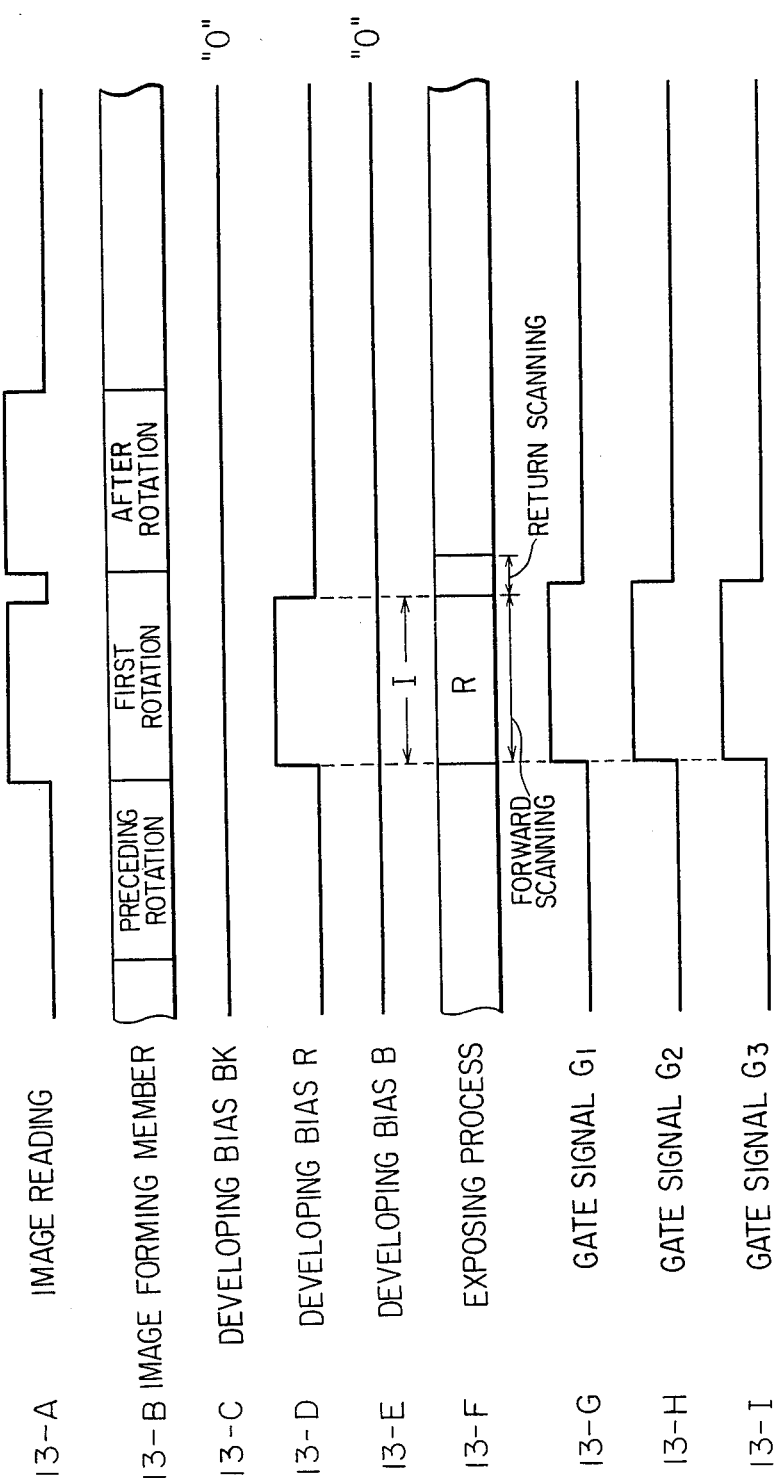

In contrast, in the color-designated recording mode, the image forming process performs the recording in only a designated color. Accordingly, the three selection signals G1 through G3 are obtained in a same phase (FIGS. 12-G through I). The example in FIG. 13 shows a case where red color is designated.

Upon the color designation, a developing bias is supplied solely into a corresponding developing unit 65 (FIG. 12-D), which is then activated. In other words, only the developing unit 65 containing a red toner (developer) is driven, and correspondingly, an image is recorded in red regardless of the color information of an original color draft 1.

Even when another color (black or blue) is designated, the image forming process is identical to that of red color operation, therefore the redundant description is avoided.

Figure 14:
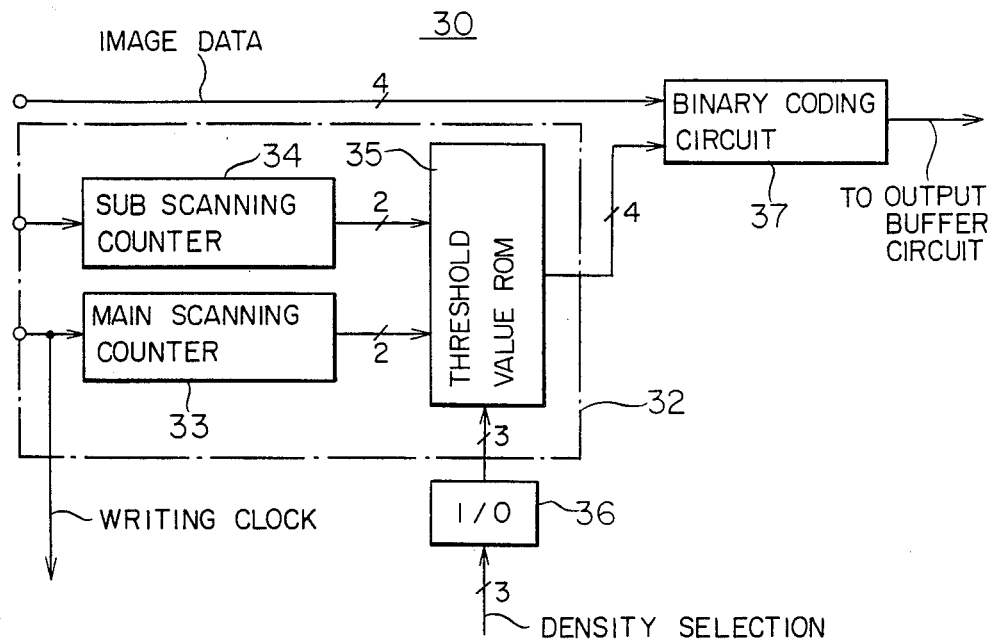
FIG. 14 is a block diagram of a binary coding circuit.

FIG. 14 is a schematic diagram illustrating on example of a binary coding circuit 30.

In this figure, a threshold table 32 comprises a main-scanning counter 33 to count the writing clock signal, a sub-scanning counter 34 to count the horizontal synchronization signal, and a matrix 35 (composed of a ROM) to output a specific threshold value data based on the counted values of the counters 33 and 34.

If an original draft is a line drawing, the data of a specific threshold value corresponding to the density of the line is used as threshold value data. On the other hand, if an original draft is a photograph, a dither matrix is used to provide the threshold value data, since binary coding by dither method is favorable for this purpose. About three types of dither matrixes are provide to cope with different densities of an original draft, and an appropriate one is selected in compliance with a density of original.

The image data outputted from the color selecting circuit 160 is, at a comparison circuit 37 for binary coding, compared to a specific threshold value obtained from the threshold value table 32 in accordance with a density selection signal received from I/O unit 36, and binary-coded on the pixel-by-pixel basis.

Additionally, prior to the binary-coding process, an original image data may be subjected to the enlarging or reducing process.

The enlarging or reducing in the main-scanning direction is effected by an electrical signalling process, and the enlarging or reducing in the sub-scanning direction is effected by varying the shifting speed of the CCDs 3 and 4 or of image information with the exposure time of the CCDs 3 and 4 kept constant.

Associated with the enlarging or reducing in the mainscanning direction, an image processing circuit is provided. For the enlarging and reducing operations, an interpolation method is employed.

The interpolation method is an image processing method to form an enlarged or reduced image by adding to or thinning out data associated with an adjacent pair of original image data, based on the levels of adjacent pair of original image data.

Figure 15:
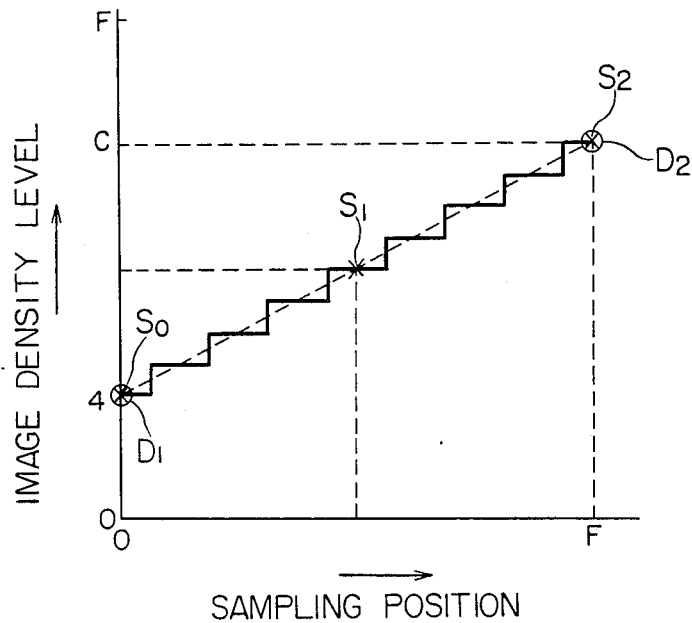
FIG. 15 explains the interpolation method.

When enlarging an original image twofold, for example, as shown in FIG. 15, a level S1 which is an intermediate level of the levels D1 and D2 of binary-coded original image is determined based on these levels, then the level S1, as well as the original-image levels D1 and D2 are used as the post enlarging image data, that is, the interpolation data.

The enlarging or reducing process is performed on the real-time basis. Correspondingly, the above interpolation data is pre-recorded on, for example, a ROM, whereby the interpolation data S is addressed by using a pair of original image data or the like.

Such data is not stored in a RAM or the like, even in the color separation, color ghost elimination and other processes. This arrangement enables the real-time processing, as well as the speedier and smaller image processing system.

Figure 16:
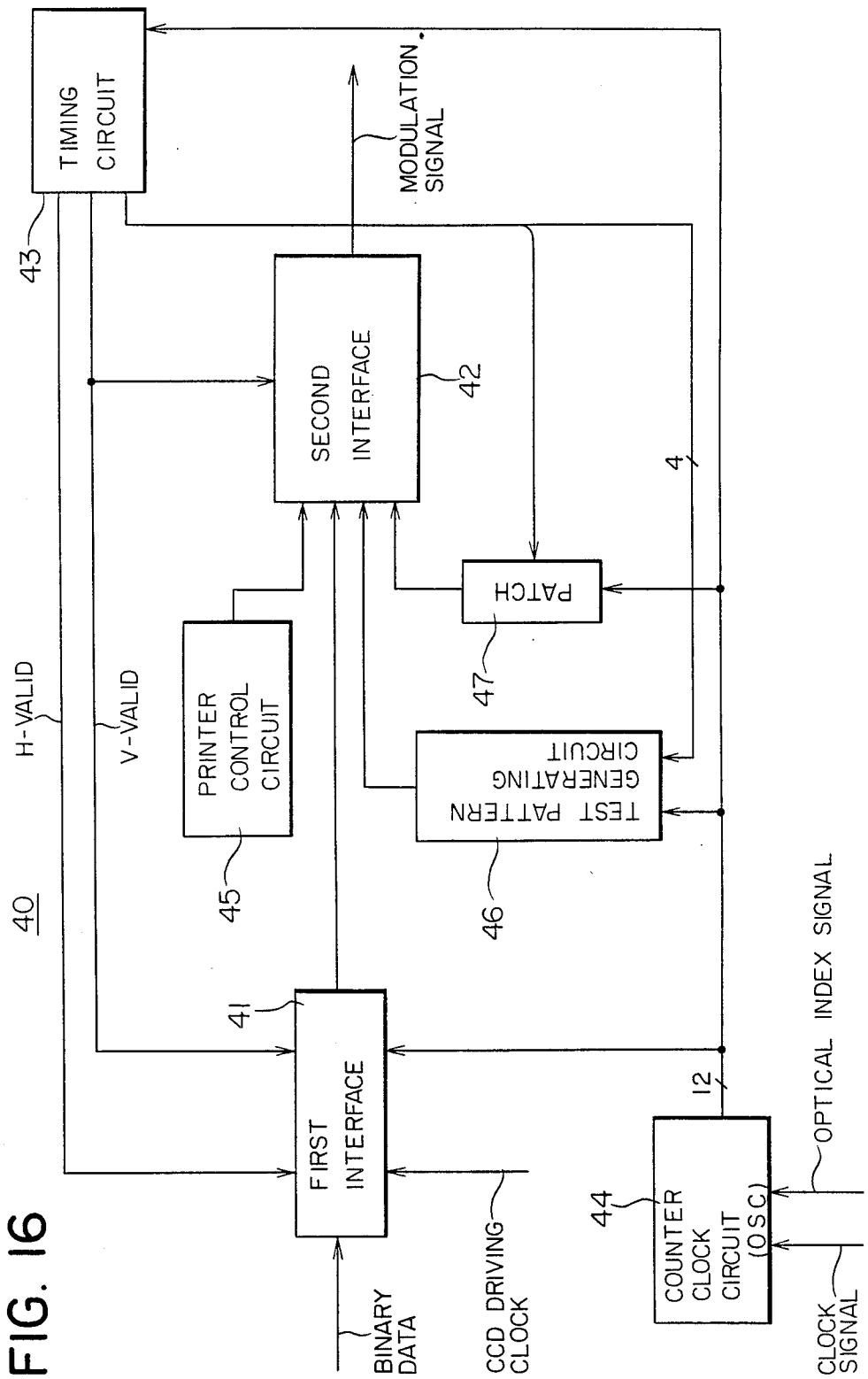
FIG. 16 schematically illustrates one example of an interface circuit.

FIG. 16 shown an interface circuit 40.

The interface circuit 40 comprises a first interface 41 to receive binary data, and a second interface 42 to receive the data transmitted from the first interface 41.

Into the first interface 41 are supplied the horizontal and vertical direction valid signals (H-VALID) and (V-VALID) by the timing circuit 43, as well as the clock signal of a specific frequency (for this example, 6 MHz) by the counter clock circuit 44. Also, the CCD driving clock signal is supplied into the interface 41.

This arrangement enables the binary data to be transmitted in synchronization with the CCD driving clock signal only during a period where the horizontal and vertical valid signals are generated.

The timing clock circuit 44 generates the main-scanning side timing clock signal being synchronous with the optical index signal.

The second interface 42 is an interface to selectively transmit the binary data transferred from the first interface 41, or other image data.

Other image data are as follows.

Firstly, such image data are test pattern image data obtained from a test pattern generating circuit 46, and secondly, patch image data obtained from a patch circuit 47, and thirdly, control data obtained from a printer control circuit 45.

The test pattern image data is used for testing the image processing operation, and the patch image data for detecting the toner density is used in the patch processing.

The test pattern generating circuit 46 and the patch circuit 47 are driven based identically on the clock signal of the counter clock circuit 44, and this arrangement enables the timing synchronization with the binary data transmitted from the first interface 41.

The binary data outputted from the second interface 42 is transmitted to an output device 100 and used as the modulation signal for a laser beam.

Figure 17:
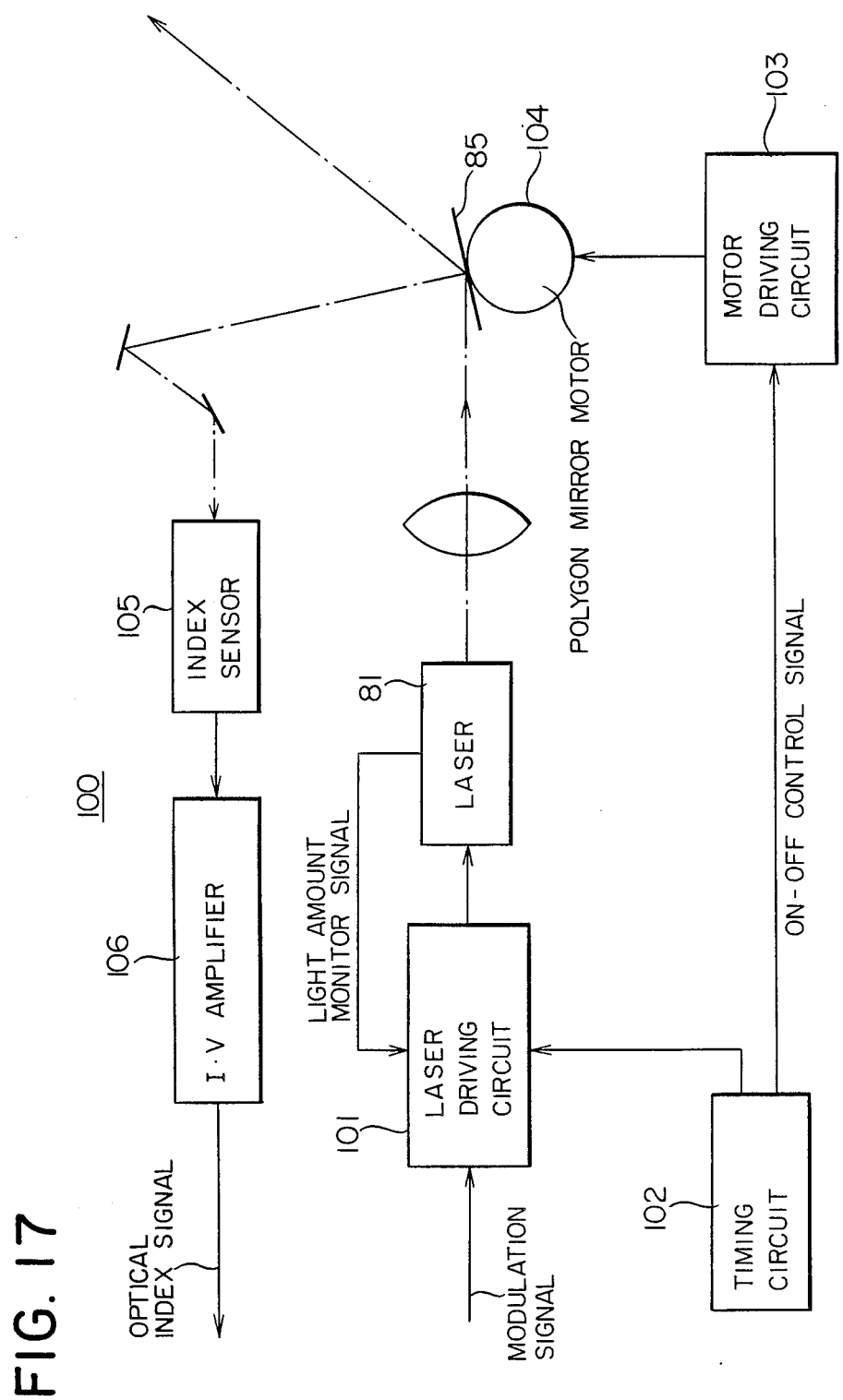
FIG. 17 is a block diagram schematically illustrating a peripheral circuitry of an output device.

FIG. 17 illustrates a peripheral circuitry of the output device 100. A semiconductor laser 81 is provided with an associated driving circuit 101. The above binary data serving as a modulation signal is supplied to the driving circuit 101, and the laser beam is internally modulated by the modulation signal. The laser driving circuit 101 is driven by the control signal from the timing circuit 102, so that it is driven only in compliance with the horizontal and vertical valid areas. Additionally, to the laser driving circuit 101 is fed back a signal representing the light amount of laser beam, so that the laser is driven controllingly to maintain a specific intensity of beam.

A mirror scanner 85 is driven by a polygon mirror motor 104. An index sensor 105 detects the initial scanning point of the laser beam deflected by the mirror scanner 85. After an I/V amplifier 106 has converted the index signal into a voltage signal, the converted index signal is supplied to the counter clock generating circuit 44 and the like, thus the optical main-scanning timing is controlled.

A reference numeral 103 represents a polygon mirror-motor driving circuit whose ON and OFF signals are supplied from the timing circuit 102.

Incidentally, the above devices and circuits are controlled either by the second or first controller 200 or 250. First, the second controller 250 is described below.

Figure 18:
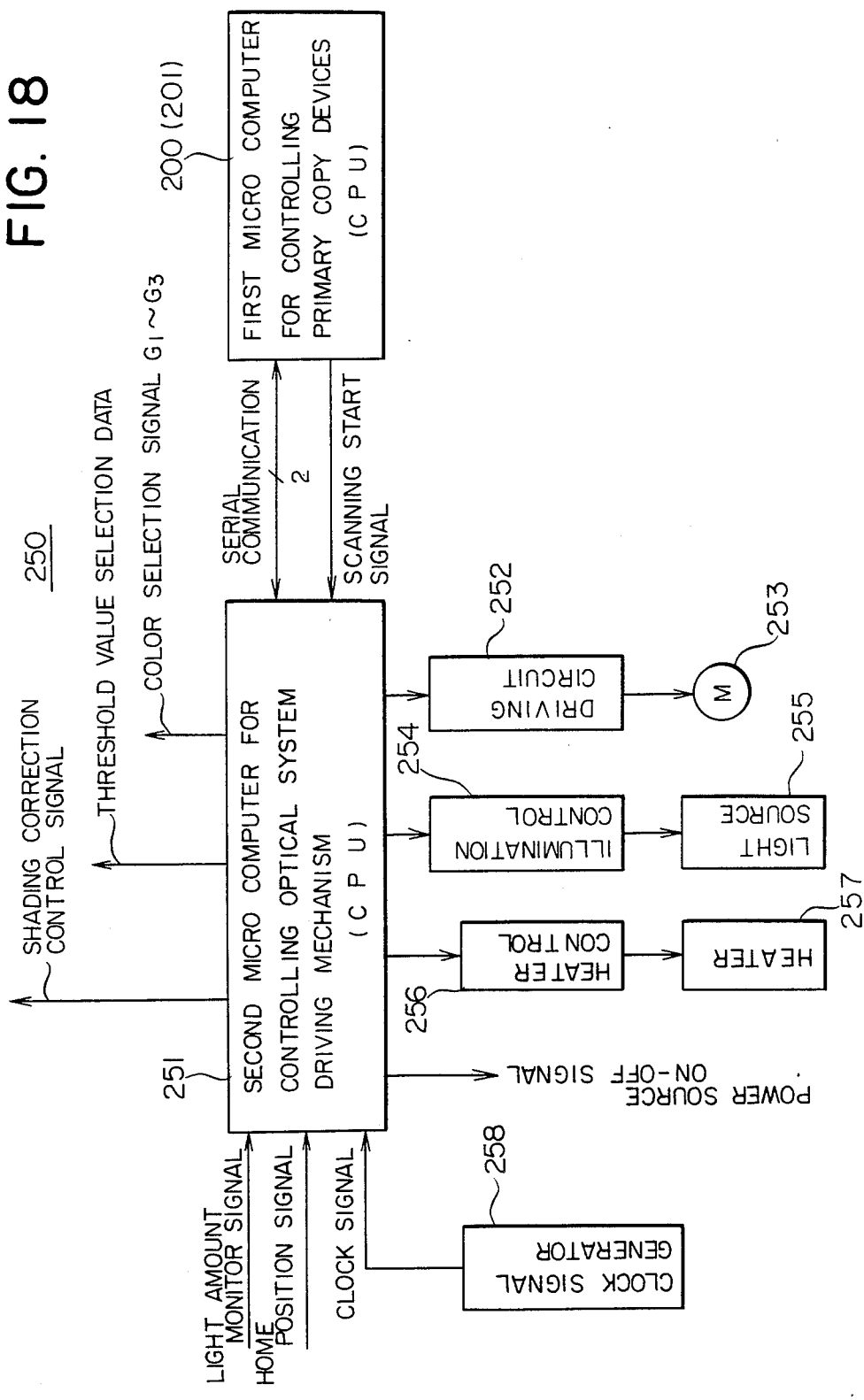
FIGS. 18 and 19 are block diagrams representing circuits respectively associated with the first and second microcomputers.

As shown in FIG. 18, the second controller 250 principally controls the image reading system as well as the peripheral devices. A reference numeral 251 represents a microcomputer (second microcomputer) to controllingly drive the optical system. The communications of various information signals between the microcomputer 251 and the microcomputer (first microcomputer) to control the whole image processing system is performed with serial data communication. The optical scanning start signal transmitted from the first microcomputer 201 is directly supplied to the interrupt terminal of the second microcomputer 251.

The second microcomputer 251 generates various command signals, in synchronization with the clock signal having a specific frequency (12 MHz) and supplied from a reference clock circuit 258.

The second microcomputer 251 transmits a command signal, for detecting and storing the shading correction data, to a memory 6 for shading correction, the selection signal for density selection to the threshold value table 32, and the color selection signal used in color recording to the color selecting circuit 160.

In addition the second microcomputer 251 also outputs the following control signals.

First, the second microcomputer 251 supplies a control signal to turn ON and OFF the driving circuits of the CCDs 3 and 4 into their associated power control circuit (unshown). Secondly, the same computer supplies a specific control signal into an lighting control circuit 254 associated with a light source (such as a fluorescent lamp) 255 to irradiate light on the original draft 1. Thirdly, the computer supplies a control signal to a driving circuit 252 to drive a stepping motor 253 which shifts a movable mirror unit provided on the image reading device 10 side. Next, the computer also supplies a control signal to a control circuit 256 associated with a heater 257.

Additionally, into the second microcomputer 251 are inputted data such as light amount information and a data designating a home position of a light source 255 comprising, for example, a fluorescent lamp.

Figure 19:
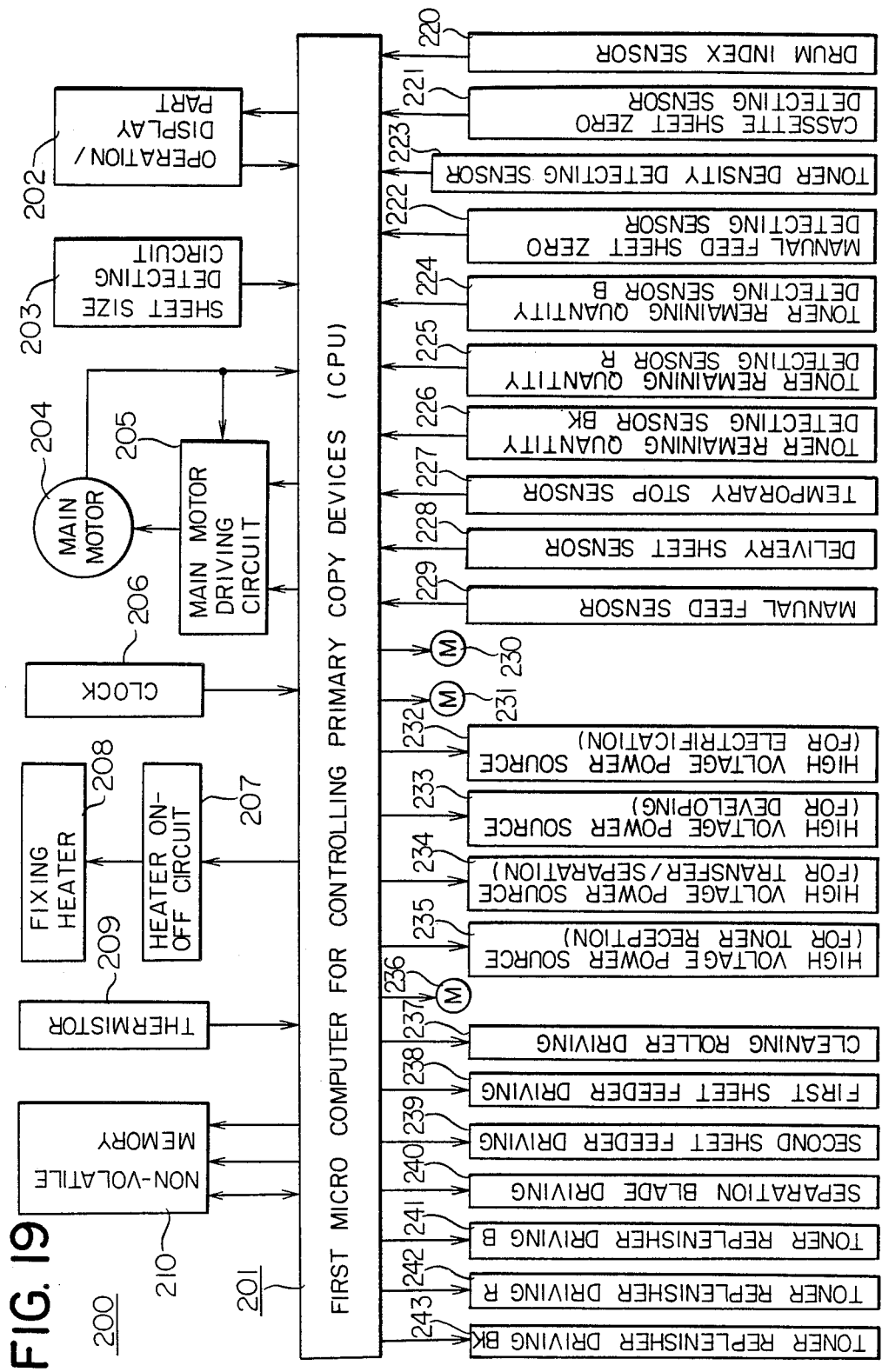

The first microcomputer 201 principally controls the color copying apparatus. FIG. 19 illustrates one example of input/output system associated with a color copying apparatus.

Various data entries such as magnification scale designation, recording position designation, recording color designation and the like are inputted into a operation/display part 202, which also displays these data entries. As a display means, an element such as an LED is used.

A sheet size detecting circuit 203 is employed to detect and display the size of cassette papers loaded on a tray, and to automatically select recording sheet size in compliance with the original size.

A drum index sensor (detecting means) 220 detects the rotational position of the drum 61 serving as an image forming member, whereby the generated index signal is used to control the electrostatic processing timing. The detail of drum index detection system is given later.

A cassette sheet zero detecting sensor 221 detects whether the paper cassette is empty or not. A manual feed sheet zero detecting sensor 222 detects the present/absence of a paper manually loaded in the manual feeding mode.

A toner density detecting sensor 223 detects a toner density on the drum 61 as well as the post-fixing toner density.

Three toner level detection sensors 224 through 226 independently detect the toner level in the respective developingly units 65 through 67, and if replenishing toner is necessary, a toner resupply indicator element mounted on the operation/display unit lights up.

A temporary stop sensor 227 detects, during the operation of color copying apparatus, whether or not a paper is correctly supplied from the cassette to the second sheet feed roller (unshown) side.

A paper ejection sensor 228 in contrast detects whether or not a fixed paper is correctly ejected outside.

A manual paper insertion sensor 229 detects whether or not a manual paper insertion tray is in place. When the tray is set into place, the manual insertion mode automatically starts.

The sensor output transmitted from each of the above sensors is fed into the first microcomputer 201. This arrangement allows both data presentation of the operation/display part 202 and arbitrary operation control of the color copying apparatus.

For color copying operation, a motor 231 exclusively associated with black color copying is provided, other than the motor 230 for developing red and blue colors. These motors are controlled by a command signal transmitted from the first microcomputer 201. Likewise, a main motor (drum motor) 204 is controllingly driven by a PLL-configured driving circuit 205. This driving circuit 205 is in turn controllingly driven by a control signal from the first microcomputer 201.

It is necessary, during color developing, to apply a specific level of high-voltage onto an active developing unit and others. For this purpose, a high-voltage power source 232 for electrification, a high-voltage power source 233 for developing, a high-voltage power source 234 for transfer-separation and a high-voltage power source 235 for receiving toner are provided, and each of which applies a specific level of high-voltage onto a corresponding unit in accordance with a requirement.

A reference numeral 237 represents a driving area of cleaning roller, 238 a driving area of first paper feed roller, 239 a driving area of second sheet feed roller, and 236 a motor for releasing the pressing of cleaning roller. Additionally, a reference numeral 240 represents driving area of separation catch.

The second sheet feed roller functions to feed a printing paper transported from the first sheet feed roller to an electrostatic latent image formed on the drum 61.

A fixing heater 208 is controlled, in synchronization with the control signal of the first microcomputer 201, by a fixing ON/OFF circuit 207.

A fixing temperature is read by a thermistor 209 and usually controlled by the first microcomputer 201 so as to maintain a proper temperature.

A reference numeral 206 represents a clock generating circuit (frequency, approximately 12 MHz).

A non-volatile memory 210 associated with the first microcomputer 201 serves to store data which should be stored even after the power is turned OFF. The examples of such data include data for total counter as well as initial setting values.

In this way, the first and second microcomputers 201 and 251 perform, in compliance with a specific sequence, various controls necessary for color imaging.

Figure 20:
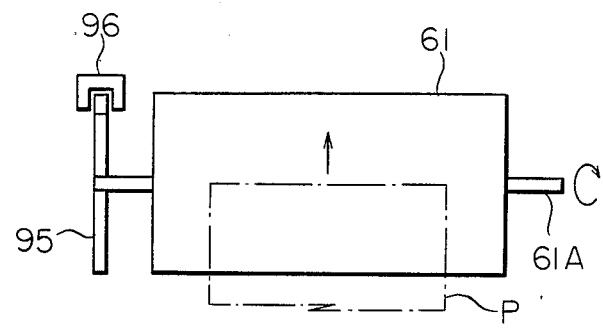
FIG. 20 schematically shows the relation between an image forming member and a drum index.
Figure 21:
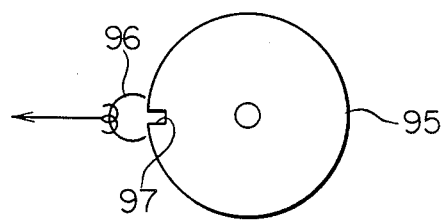
FIG. 21 is a plan view illustrating the above relation.

FIG. 20 illustrates one example of a detection system detecting the drum index signal, wherein a disc shaped index element 95 constituting one rotating entity together with the drum 61 is mounted on one end of a rotary shaft 61A of the drum 61. Additionally, as shown in FIG. 21, a notch 97 having a specific depth and width, being U-shaped in this example, is formed on one area on the circumferential face of the index element 95.

In this example, as opposed to the circumferential face of index element 95, an index sensor (detection means) 96 is provided so that it straddles the part of circumferential face.

With this arrangement, the index sensor 96 generates a pulse-configured index signal (FIG. 34-A) every time the notch 97 of index element 95 pass through the sensor 96, and the rotational position of drum 61 is detected with the index pulse-signal.

Additionally, such a drum index element 95 may be disposed in one position on the circumferential face of drum 61 as far as the position does not hinder the transportation of a recording paper.

Figure 22:
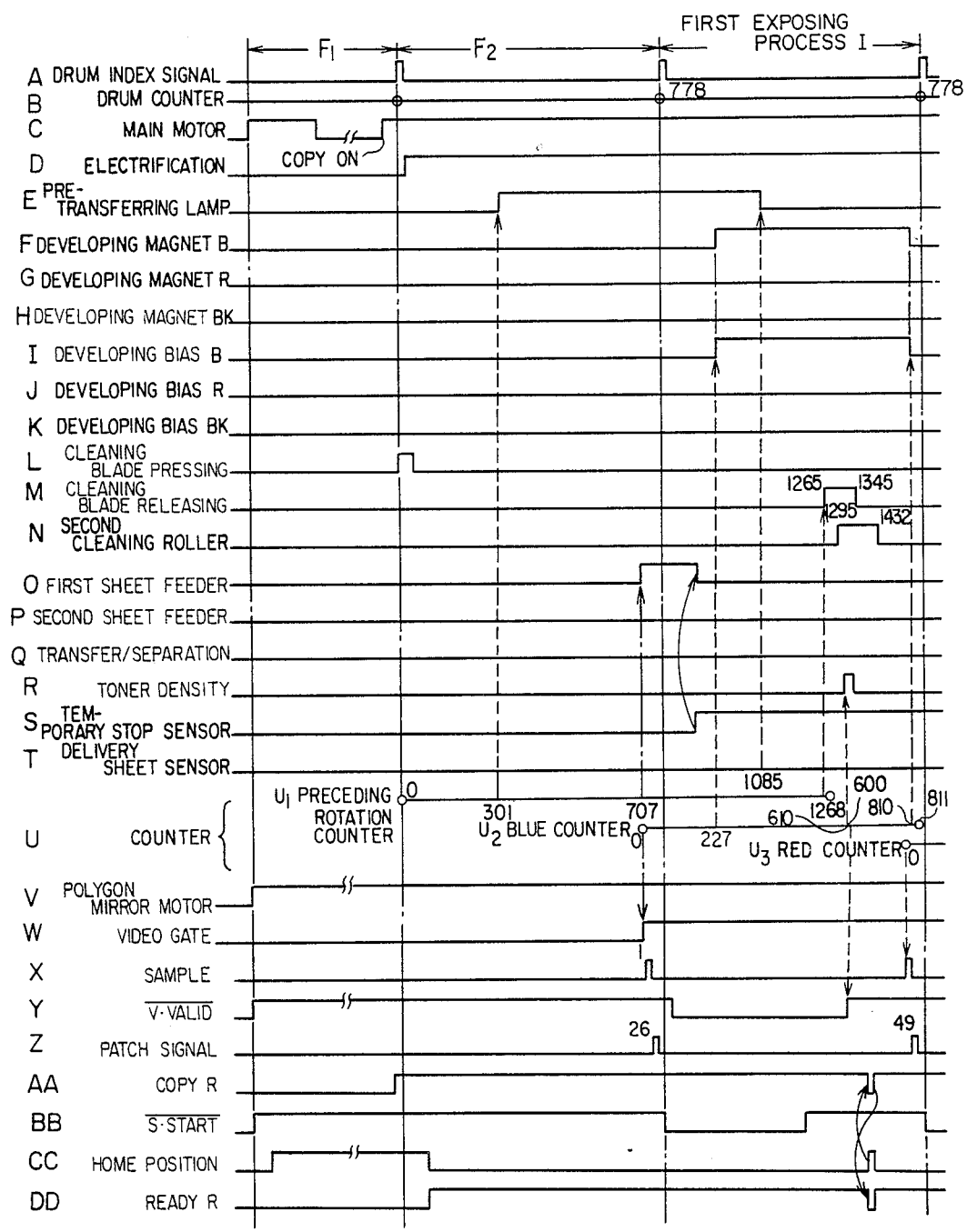
FIGS. 22 through 24 are waveform diagrams jointly illustrating the color recording operation.
Figure 23:
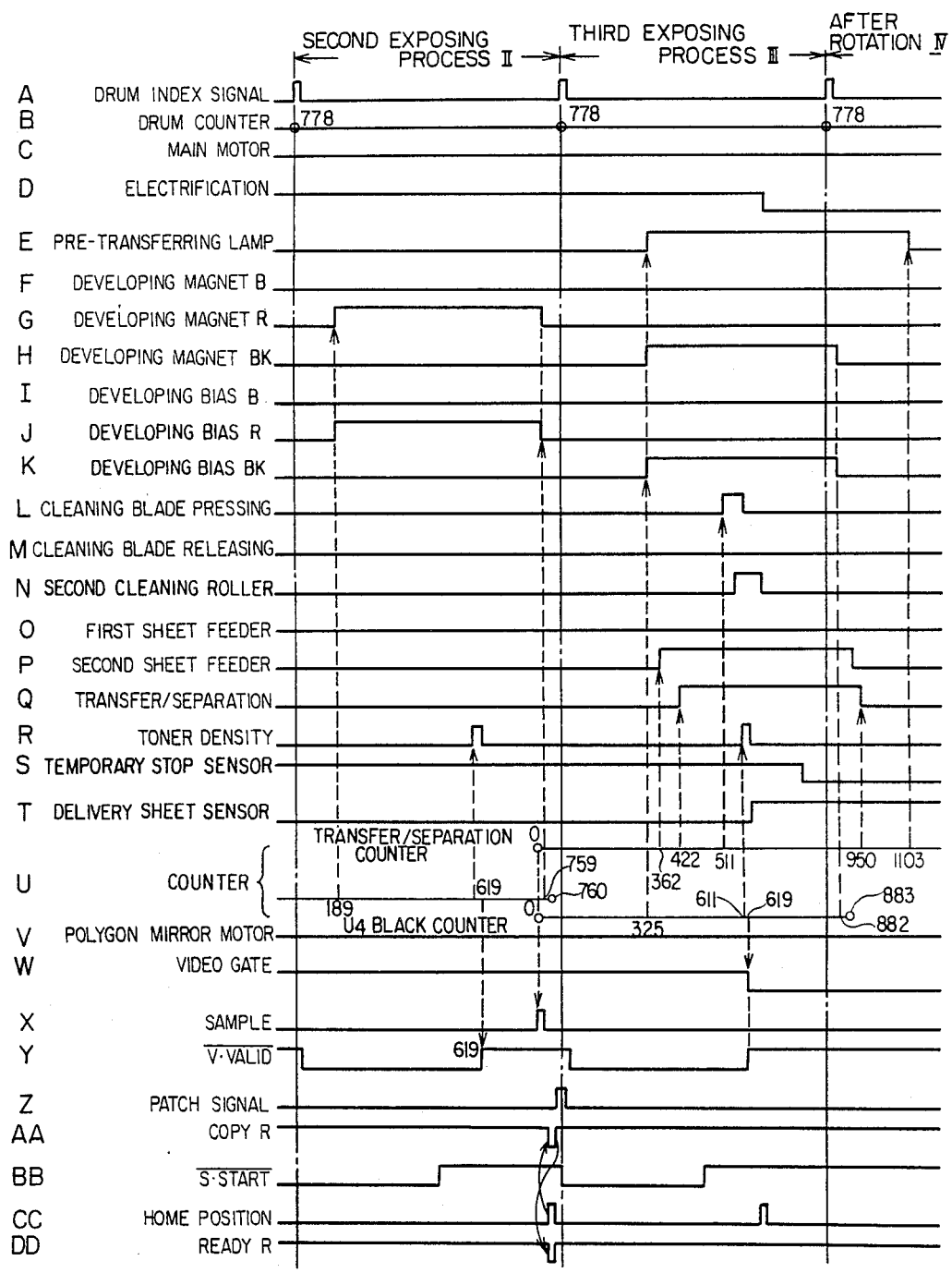
Figure 24:
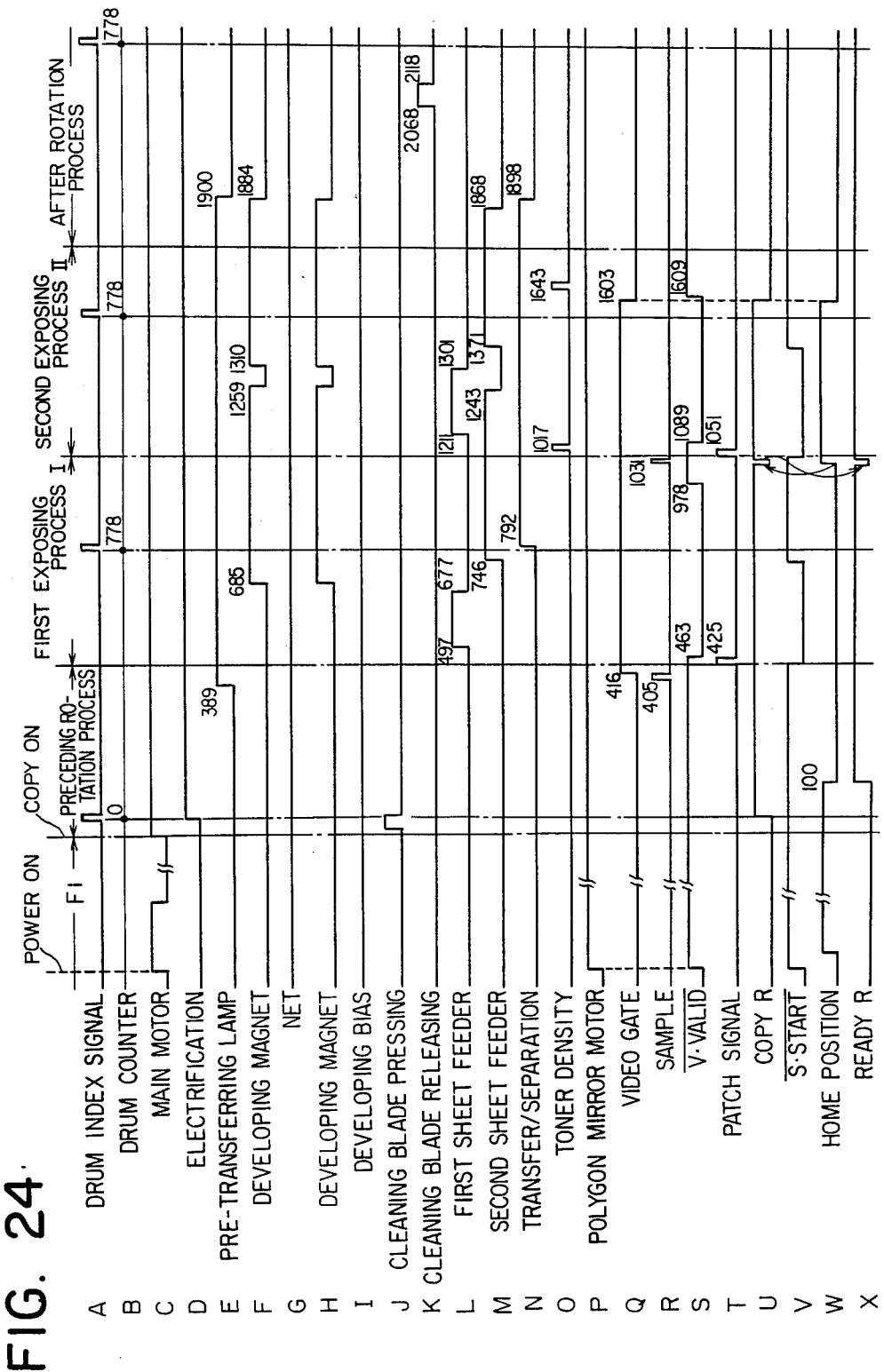

Next, a series of processing steps in color recording operation are hereinunder described in detail with the reference to FIGS. 22 through 24. In this example, an arrangement has been incorporated to enable, in addition to a multi-color recording mode (three colors; blue, red and black), recording an externally designated image reading area in a specific color (mono-color). Accordingly, at first, the multi-color recording mode is described with the reference to FIGS. 22 and 23.

The description, however, in some areas is identical to that of FIGS. 12 and 13.

In FIGS. 22 and 23, period F1 represents a period from the main power source of copying apparatus is turned ON until a copy button is pressed. Period F2 is a period corresponding to the pre-rotation process of the image forming member (hereinafter called a drum).

Period I is blue-developing period, period II red-developing period, period III black-developing period, and period IV post-rotation process period or after rotation process.

The numerals in the figures are counted values of the drum counter, or of other counters including pre-rotation counter described later and others.

Turning ON the main power source rotates the main motors including a drum motor 204 for a predetermined period, then pressing the copy button activates the main motor (FIG. 22-C). When the index sensor detects the notch of index element 95 mounted on the drum 61, the drum counter is cleared (FIGS. 22-A and -B). Afterwards, all the processing steps are performed in synchronization of the counted value of the drum counter.

The time span of each of periods I through IV is identical with each other. In this example, the counted value 778 corresponds with one rotation of drum 61.

Upon the initiation of pre-rotational period F2, the electrification of drum 61 starts (FIG. 22-D). The electrification of drum is maintained until the completion of first exposing process (see period IV).

During the pre-rotation period F2, at approximately middle time point, the pre-transfer lamp lights up for a specific duration (until the middle time point in blue-developing period I) so as to execute the pretreatment of color development.

When the rotation of drum reaches the blue or black developing area, both the magnetic member 76 and the developing sleeve 75 provided on each of the developing units 65 through 67 are rotated and directed to a corresponding area, and simultaneously, development bias is energized in synchronization with the rotational timing of these elements (FIGS. 22-F through -K).

A cleaning blade 94 is pressed on the drum 61 upon the rise of drum index signal in the pre-rotation period F2 so as to remove toner adhered to the drum 61 surface (FIG. 22-L), and released when the drum 61 has completed one rotation after it is pressed (FIG. 22-M). However, a part of toner powder may remain unremoved on the drum surface, or toner may fly around when the blade is released. For this reason, the cleaning roller is activated shortly after the releasing of blade, in order to remove the unremoved toner (FIG. 22-N).

Immediately before the start of blue developing period I, the first sheet feed roller starts rotation to transport a recording paper to the second sheet feed roller (FIG. 22-O). The first sheet feed roller serves to transport a recording paper loaded in a cassette. The recording paper already transported to the second sheet feed roller is further transported to the drum 61 side by the rotation of second sheet feed roller. This transportation timing corresponds with the final exposing period (in this figure, exposing process III) (FIG. 23-P).

The paper feeding operation by first sheet feed roller is cancelled when the recording paper reached halt sensor provided immediately before the second sheet feed roller, and this in turn activates the second sheet feed roller. When the recording paper has passed the second sheet feed roller, the output level of sensor drops to zero (FIG. 23-S).

A little after the actuation of second sheet feed roller, the transferring is performed, and synchronously, a specific level of AC voltage is applied to a paper separation electrode in order to prevent a recording paper from being taken up by the drum 61 during transferring (FIG. 23-Q).

After the level of temporary stop sensor 227 has dropped to zero, and upon the completion of developing and fixing, a paper ejection sensor 228 detects the ejection status of a paper having been subjected to the fixing.

In case of the color recording, the toner density detection is performed per individual color developing processes. The timing of density detection is based on the counted value of individual detection counters for blue through black colors (FIGS. 22-U2 through 23-U4). These counters are respectively reset based on the starting timing for writing density detection patch, the blue counter is reset when the counted value of drum counter reaches 706, and the toner concentration is detected when the counted value after resetting reaches 602.

Likewise, the blue counter is reset when the counted value of drum counter reaches 707, and, similarly, the black counter is also reset when the counted value of drum counter reaches 707.

During this course, the toner density is detected with the reference to a specific image area. For this purpose, the patch signal (for example, image signal corresponding with a patch of $8 \times 16$ mm image area) illustrated in FIGS. 22-Z and 23-Z) for toner density detection is used. A specific period after the patch signal is obtained, the toner density detection signal (FIGS. 22-R and 23-R) is outputted to detect the image density on the specific image area.

The pre-rotation counter is cleared at a timing when the first drum index signal pulse is generated first time after the copying operation is initiated, and the pre-rotation process terminates when the counted value reaches 1266 (FIG. 2-U1).

Turning ON the main power source in turn actuates the polygon mirror motor 104 to drive the mirror scanner 85, whereby the mirror scanner 85 is rotated at a constant speed (FIG. 22-V).

Image data necessary for recording an image are transmitted at the following timing. More specifically, an arrangement has been incorporated so that the level of video gate becomes "1" in synchronization with the blue counter and becomes "0" at the completion of black-color writing with a laser (FIG. 22-W), and that the image data is transmitted to the output device 100 only during a period where the level of video gate is at "0".

Vertical direction valid signal (V-VALID) is generated and transmitted, only during a specific period (if a recording paper is A4-sized, the duration for the counted value to reach 28) within each developing step (FIGS. 22-Y and 23-Y).

The first microcomputer 201 on the copying apparatus side transmits V-Valid signal to the second microprocessor 251 to control optical system, which in turn outputs the start signal to start optical scanning. The optical scanning signal activates the optical scanning, in correspondence with the falling edge from level "1" to "0" (FIGS. 22-BB and 23-BB).

If the image reader has a constitution, wherein a movable mirror unit having a light source which constitutes a part of image reading means is allowed to shift, the home position signal designating the home position of optical system is, per individual developing steps, transmitted from the second microcomputer 251 to the first microcomputer 201 (FIGS. 22-CC and 23-CC).

Upon reception of the home position signal, and if a next exposing is required, the first microcomputer 201 transmits the copy signal R (FIGS. 22-AA and 23-AA) to the second microcomputer 251 (FIGS. 22-DD and 23-DD).

The above text is the description of timing charts schematically illustrating the multi-color recording operation.

In recording an original image in an externally designated color, the timing charts will look as shown in FIG. 24, wherein only imaging process with a designated color is performed and other imaging processes are not executed.

Therefore, the detailed description of each mono-color imaging step is avoided. However, the imaging step in FIG. 24 is a case where an image is recorded in black (normal monochromatic copying operation). The above-mentioned series of color imaging processes are controlled, as mentioned previously, by the first and second microcomputers 201 and 251.

Next, the control program for effecting such imaging processes are described below with the reference to FIG. 25 onwards.

Figure 25:
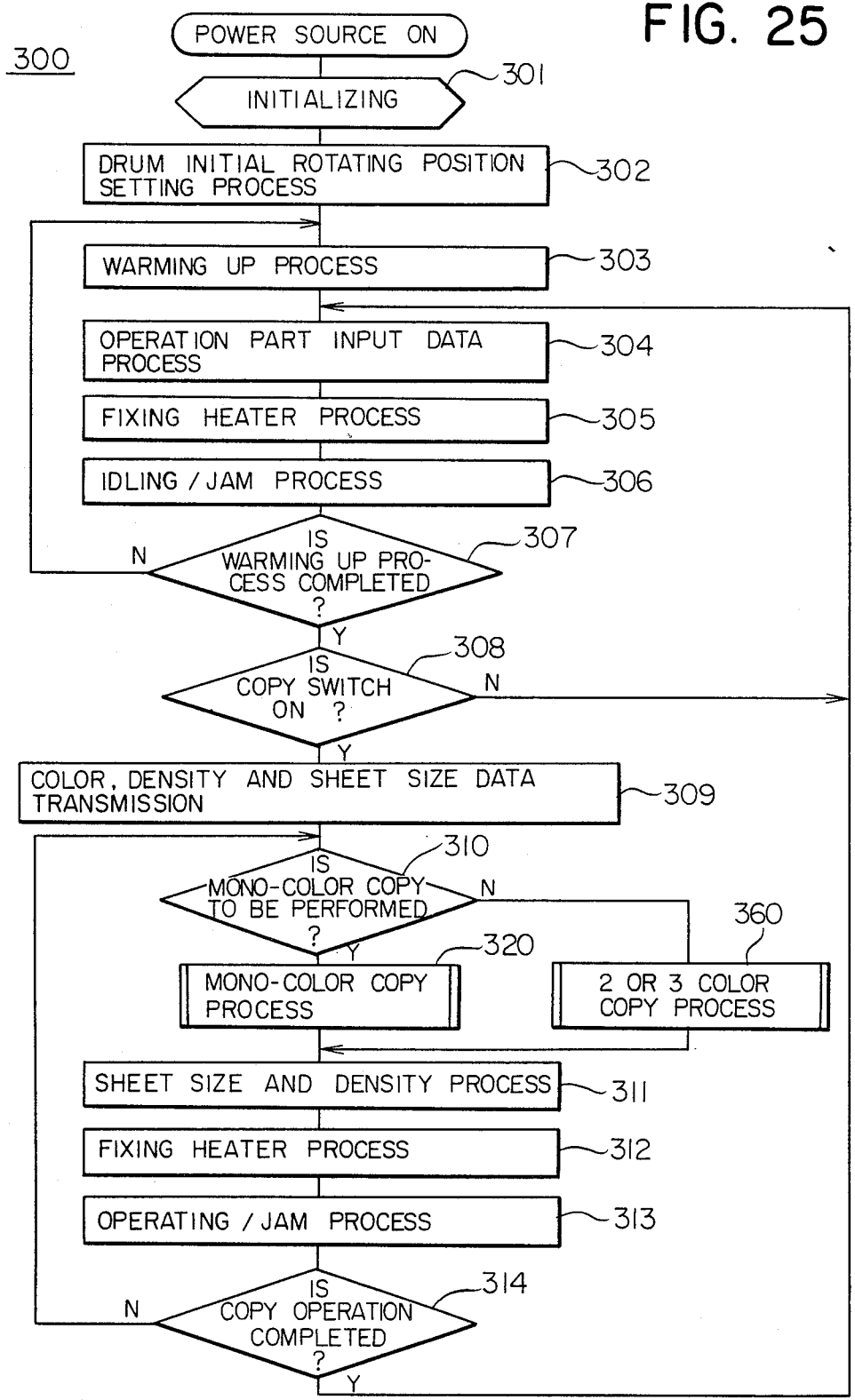

In FIG. 25, a numeral 300 represents one example of a flowchart illustrating a control program stored in the first microcomputer 201.

Turning ON the main power source actuates the control program, starting a mode to initialize the operation of apparatus. Accordingly, after the initialization of apparatus (step 301) as the first step, the initial rotating position setting process for drum 61 is performed (step 302). The initial rotating position setting process is a rotation control process performed to reset the drum 61 to a predetermined position, based on the index signal generated at the index element disposed on the drum.

Then, the following steps are sequentially executed: a warming up process (step 303) involving fixing, turning ON of a light source: processing of data entries (step 304) entered with an operation/display part, including color designation, designation of number of sheets to be copied; temperature control (step 305) for a fixing heater; idling/jam process (step 306) including stand-by for copying, and recovery from paper-jamming.

Whether such steps including warming-up have completed or not is judged in the next step, step 307. If the warming-up process has not yet completed, the step 303 is resumed and the similar processing sequence is again executed. If the warming-up process has already completed, whether the copy button has been pressed or not is checked. If the copy button has not yet been pressed, the step 304 is resumed and the copying apparatus wait for data entry (step 308).

When the copy button is pressed, various data entries such as color designation, density designation, sheet size designation and the like entered with the operation/display part are serially transmitted from the first microcomputer 201 to the second microcomputer 251 (step 309). Simultaneously, judgement is made to determine the current color mode (step 310): mono-color copy mode; three-color, that is, multi-color copy mode, or; two color copy mode.

In mono-color copying operation, the mono-color copying routine in step 320 (subroutine) is called. Similarly, in the case of two- or three-color copy mode, a subroutine-configured two- or three-color copying routine is called (step 360).

When these subroutines have been completed and the main routine is resumed, the sheet size process, density process, fixing heater process, and operating jam process (steps 311 through 313) are performed, then whether copying has completed or not is judged (step 314). If the copying has not completed, the step 310 is resumed. If the copying has completed, the input data processing step 304 is resumed and the similar processing steps are performed.

Figure 26:
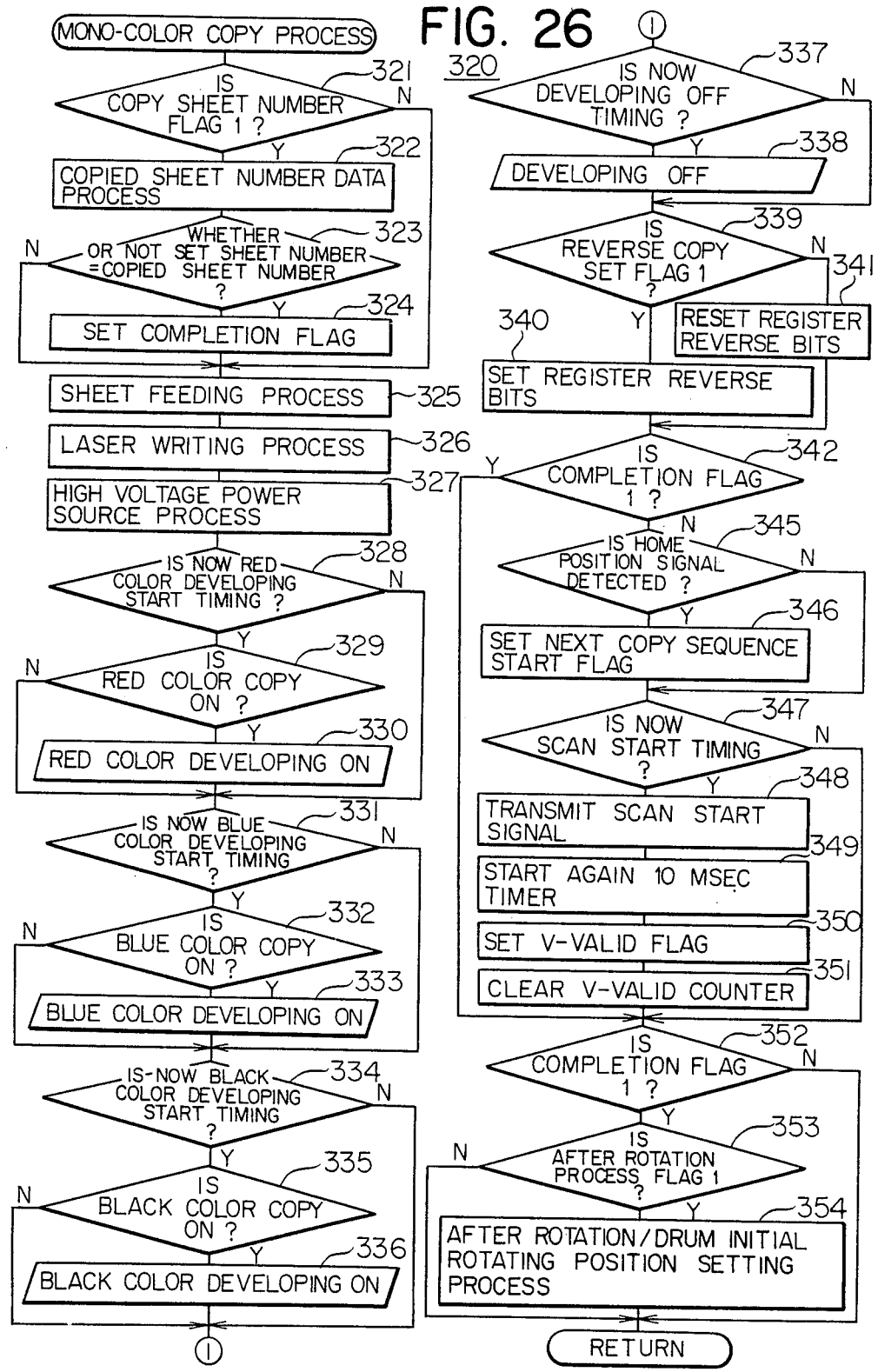

FIG. 26 is a flowchart illustrating one example of monocolor copy process.

When the mon-color copy routine is called, a flag representing a number of sheet to be copied is searched (step 321). Such a flag is reset every time a recording paper is transported to the second sheet feed roller. If there is no copysheet number flag, the step 325 is initiated. If there is such a flag, data for a number of sheets to be copied is processed (step 322).

If actual number of sheets copied does not reach a predetermined number of sheets (set number of sheets), the processing shifts to the sheet transporting step, in step 325. If actual number of sheets copied reaches a predetermined number of sheets, a termination flag indicating the number of sheets copied is set (step 324).

When paper transporting process is complete, processes to white with a laser 81, to apply high-voltages from the high-voltage power sources 232 through 235 respectively to the developing units 65 through 67 are performed (steps 326 and 327).

Upon the completion of checking each of such processes, the developing is performed (steps 328 through 336). In the developing process, the starting timing for each developing step is detected.

In a mono-color copy mode, the developing is performed only with a specified color. For convenience of description, only a red-color designated operation is described below. In a mono-color copy mode, each developing start timing is determined based on the mono-color sequence counter, regardless of a designated color.

For this reason, a red-developing start timing is first judged, and if the judgement complies with the red-developing start timing, the presence/absence of red copy flag is checked (more specifically, the designation entered with the operation/display part is checked). If there is the red copy flag, the red developing starts (steps 328 through 330).

Upon completion of such a developing step, the operation shifts to the initiation of blue and black developing. In this case, however, only red has been designated, and accordingly, the blue and black developing steps are skipped, and the developing OFF timing is detected in the step 337 based on the mono-color sequence counter.

If the developing OFF timing is detected, the developing is turned OFF (steps 337 and 338), and simultaneously, the existence/absence of reverse copy designation is judged. If the reverse copying mode has been designated, the reverse bits are set in the register, and if the reverse copying mode has not been designated, the reverse bits in register are reset (steps 340 and 341).

Next, if the actual number of copied sheets does not match the number of designated sheets to be copied, the end flag is not 1. In this case, whether the optical system is in the home position or not is judged (step 345). If the system is in the home position, the start flag of next copying sequence is set, in the step 346.

Next, the scan start timing for optical system is detected (step 347). If this timing is actually detected, the scan start signal is transmitted to the second microcomputer 251. At the same time, a timer (10 msec timer, in this example) regulating the writing timing of laser is restarted (step 348 and 349). When the optical system completes the scanning from the home position to the edge of original draft (writing start position), the writing start status is attained.

When the timer restarts its cycle, the flag for vertical direction valid signal (V-VALID) is set, and the corresponding counter is cleared (steps 350 and 351). This starts the image writing mode based on the red signal, and which in turn independent red image is modified into a latent image, and the developing process is performed.

Once the counter is cleared, whether the end flag is 1 or not is judged (step 252).

If the end flag is 1 (step 352), the post-rotation process is performed, and the drum 61 initial position setting process (354), the program operation returns to the main routine.

If a color other than red is designated, a similar process is performed. When blue operation is specified, the steps 331 through 333 are performed, and when black copying operation, that is, a normal monochromatic recording mode, is specified, the steps 334 through 336 are performed.

Until the copying operation fully completed, the above-mentioned steps, that is, the mono-color copying routine 320, sheet size/copying density process routing 311, fixing heater control process routine 312 and operating jam process routine 313, are repeated.

Figure 27:
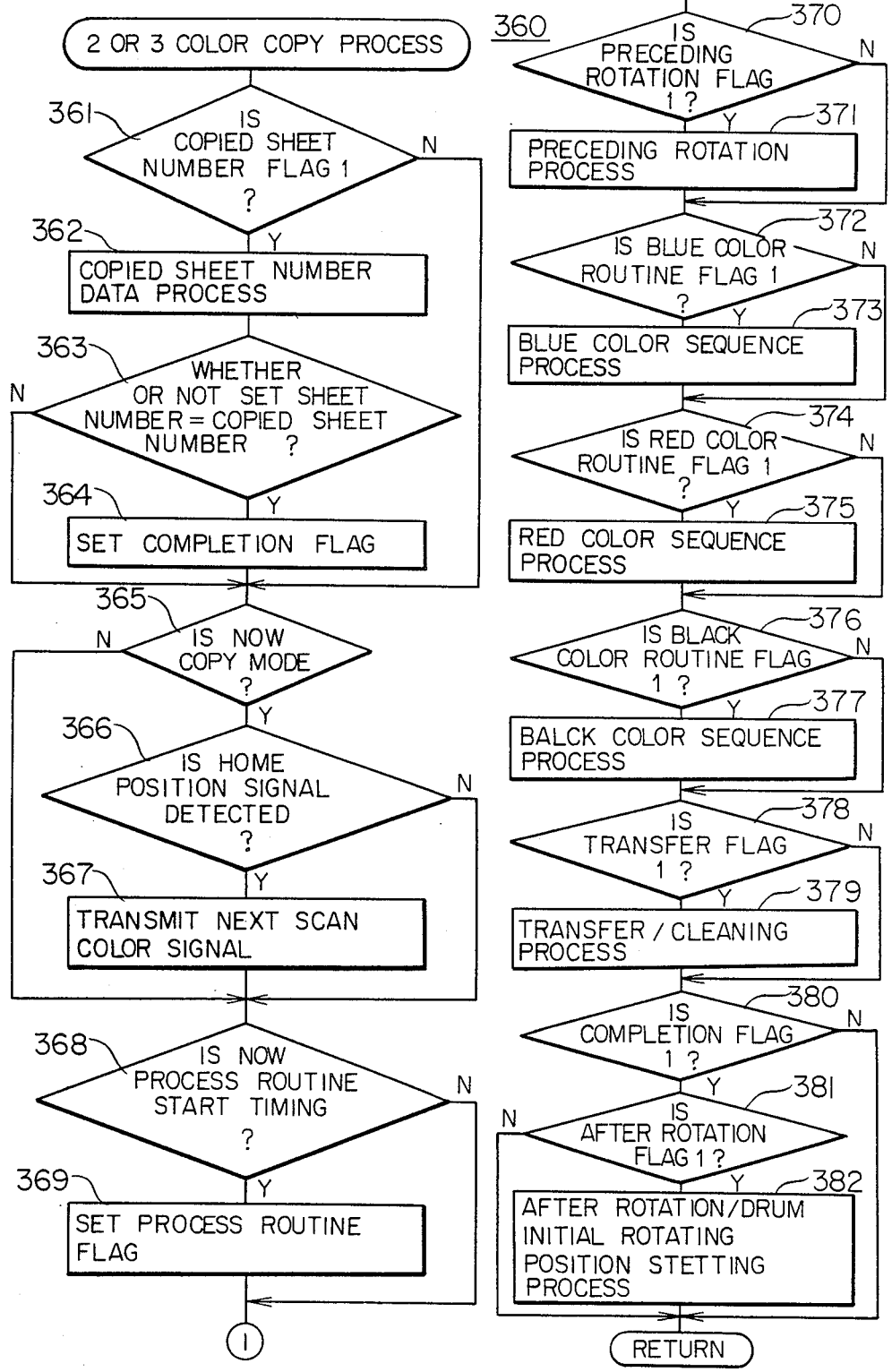

FIG. 27 illustrates one example of control program where two- or three-color copy sequence is called.

When the two- or three-color copying routine is called, the processing steps from a step to judge the flag status of a number of sheets to be copied through a step to set the end flag are identical to those of mono-color copy mode (steps 361 through 364). Next, the judgement is made on which is the current copy mode, the scanning copy mode where the optical system is driven or the video input copy mode for a video printer (step 365). In the scanning copy mode, and when the optical system is in the home position, the color signal to be scanned next is transmitted to the second microcomputer (steps 366 and 367), whereby the status of color developing routine start timing is examined. If the color developing routine start timing is detected, the developing routine flag is set (steps 368 and 369).

If the current mode is not the scanning copy mode, or if the optical system is not in the home position, the processing proceeds to the step 368, judging step.

Once the processing routine flag is set, the microcomputer examines the status of pre-rotation flag. If the flag is 1, the pre-rotation is performed (step 370), then followed by the processing routine corresponding to each individual color. For this purpose, the flag of blue routine is first checked. If the flag is 1, the blue sequence processing is performed (steps 372 and 373). Likewise, the judgement of red and black color processing routines are made by referring to corresponding flags (steps 374 through 377).

Accordingly, in the multi-color copy mode, these individual color processing routines are performed. In contrast, in the case of two-color copy mode, only processing routines for specified colors are performed.

Upon the completion of all the color processing sequence, the transfer flag is checked. If the transfer flag has been already set, transfer as well as cleaning of the developing units 65 through 67 are performed, then the status of copy completion flag is judged. If the copy completion flag has been set, and when the post-rotation flag is at 1, the post copying treatment, that is, post-rotation/drum initial rotating position setting process, is performed (steps 378 through 382).

When the flag of color processing routine is set, the color processing designation routine 400 shown in FIG. 28 is called.

For convenience of description, a preferred example, wherein the color processing routine sequentially performs blue→red→black, is described.

At first, a color currently being scanned is judged (step 401). If the blue flag has been set, the blue scanning is performed. In this case, accordingly, the status of red flag is checked. If the red flag has been already set, and if the black flags has been also set, the flag of red processing routine is to be set (steps 402, 403 and 405). If the black flag has not been set, the transfer flag and the flag of red processing routine are to be set (step 404).

If the red flag has not been set, the transfer flag is set after the flag of black processing has been set (steps 408 and 409). If the blue flag has not been set at all, or blue processing routine has been completed, the presence/absence of black flag is checked when the scanning color proceeds to red. Then, if the flag has been already set, the subroutine sequence proceeds to the step 408. If the flag has not been set, the presence/absence of completion flag is checked. If the flag has not been set, the flag of next color processing routine, that is, the blue processing routine, is to be set (steps 410 and 411).

In the course of black scanning, if there is a completion flag having been set, the processing sequence returns to two- or three-color scanning routine. Otherwise, the flag of next scanning, that is, blue scanning, is checked. If this flag exists, the flag of blue processing routine is to be set in the step 411. If the above flag does not exist, the processing sequence returns to the step 405, and the flag of red processing routine is to be set.

The reason why such an arrangement has been incorporated into color designation processing routine is that, since colors being designated can be either two or three, it is always necessary to perform color processing with every specified color being judged to enable processing regardless of what colors have been designated.

Incidentally, in the two- or three-color copy mode, a plurality of latent images individually corresponding with each color are superposed on one another to form a color latent image as required, then the image is fixed. Accordingly, in the course of such copy mode, the registration alignment of a latent image currently being written with the previously developed image is of significant importance. This is because poor registration extremely deteriorates a quality of recorded color image.

The degree of registration depends whether or not the initial scanning position of drum per individual color is constantly at a specific position.

Accordingly, the invention incorporates the drum scanning control routine to always monitor the initial scanning position of the drum.

Figure 29:
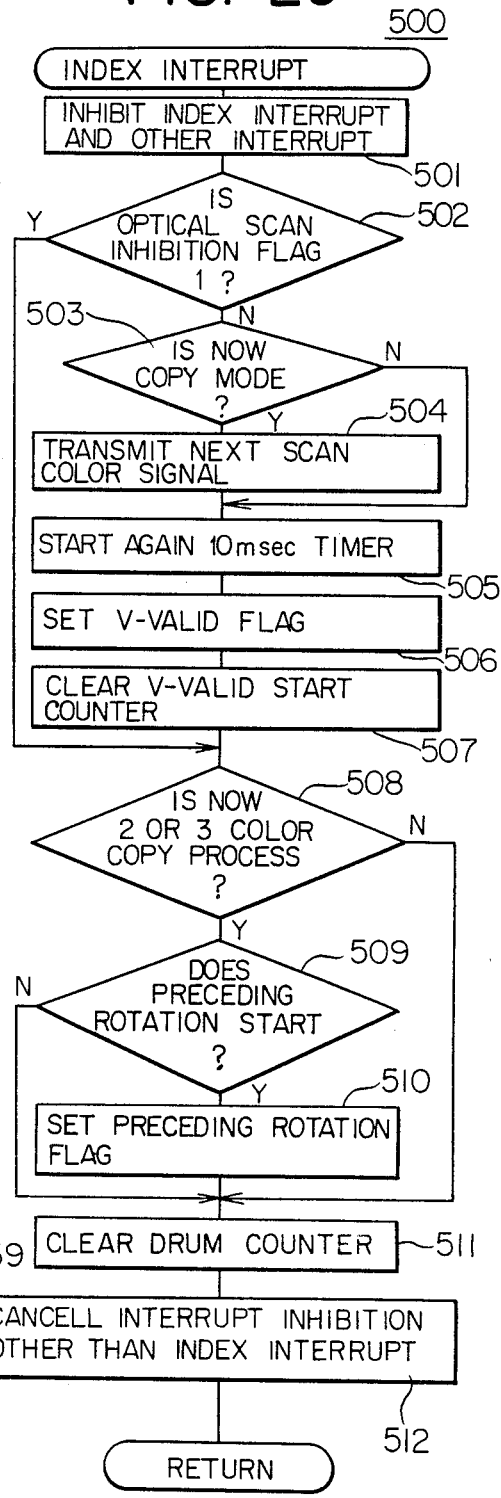

FIG. 29 illustrates one example of such a control routine.

The detection of rotation position of the drum 61 is effected by detecting the notch 97 on the index drum 95 associated with the drum 61 and serving as an index element. Using an optical or electromagnetic detection means 97 to detect the passage of notch 97 on the index drum 95, and by establishing the correlation between the detection position and the optical initial writing position, the initial writing position and the rotation position of drum are regulated as required simply by detection of the index signal.

Detecting the index signal (FIG. 36-A) being obtained once per one turn of the drum 61 allows the above-mentioned control routine, which is the index interrupt routine to be called and the control program to be started.

When index interrupt starts, the interruption processes called by both following index signal and other signal are inhibited (step 501). The reason for provision of such a step is to prevent this control process routine from being erroneously actuated by an pulse-configured external noise rather similar to the fall of index signal.

As shown in FIG. 36, the index interrupt inhibit period TM is a little longer than the stand-by period TS which starts upon reception of the index signal and lasts until the start of writing with a laser, or is a period lasting until immediately before reception of the next index signal.

The reason for why the above period is so designed is that, since the rotational position of drum 61 and the laser writing start timing should correspond with each other, the index interrupt routine should be inhibited to restart at least during the stand-by period TS which lasts until the initiation of writing with laser.

The interrupt inhibit period TM is detected with a step 535 incorporated into another processing routine 530 described later.

When the index interrupt inhibition process (a process to inhibit the interrupt with index signal or another signal) is initiated, if an optical scan inhibition flag is ON or not checked (step 502). This flag is set to 1 in the following case.

With the preferred example, the flag is ON when mono-color copy mode is performed, since a sequence to start optical scanning in synchronization with the index signal has not been selected. Additionally, in either the pre-rotation process or post-rotation process, the flag is turned ON, since the processing using the index signal is not necessarily compulsory. Accordingly, in two- or three-color copy mode, and other than in the pre-rotation process and post-rotation process, the flag is to be reset.

In two- or three-color copy mode, whether the current mode is a scanning copy mode or not is examined in the ensuing step. If the current mode is not the scanning copy mode but the video input copy mode, the apparatus functions as a printer to write a signal transmitted from a printer controller. This arrangement eliminates the optical scanning, and the process in step 504 is skipped to immediately perform the process in step 505. Correspondingly, in the video input copy mode, the scan start signal is not transmitted from the first microcomputer 201 to the second microcomputer 251.

On the other hand, if the current mode is scanning copy mode, the scan start signal to start the optical scanning is transferred from the first microcomputer 201 to the second microcomputer 251 (steps 503 and 504). This allows the optical system to promptly start the optical scanning (FIG. 36-F).

Upon initiation of the optical scanning, the reference timer used to coordinate the writing timing with the scanning is reset and restarts (step 505). By counting the restarted reference timer pulses in the reference timer interrupt routine illustrated in FIG. 30, the distance from the initial optical scanning point to the original document 1 positioned on the draft deck 1A. In this example, the pulse is outputted every 10 msec. However, the scope of the invention is not limited only to such an example (FIG. 36-C).

By starting the reference timer in synchronization with the index signal, the reference timer is restarted every time the drum 61 completes one rotation. Correspondingly, even if the interrupt timing with the drum index signal differs every time the drum 61 turns, it is always possible to align each other the initial rotating position of drum 61, the writing start timing with laser, and the position of leading edge of original draft relative to the optical system, by designating image data writing start timing of the optical system based on the number of counted reference timer pulses (FIGS. 36-D and -E).

As the reference timer restarts, the flag of vertical direction valid signal (V-VALID) is set, and simultaneously, the start counter of vertical direction valid signal (V-VALID) is cleared (steps 506 and 507). The start counter is used to designate the initial writing position of a laser, and to designate the valid reading area in the sub-scanning direction, and its counted value increments +1, for example, in the reference timer interrupt routine 530.

Upon completion of these processes, whether or not the current mode is the two- or three-color copy mode is examined. If the current mode is such a mode, whether the pre-rotation process has been started or not is checked. If the pre-rotation process has been already started, the flag for this process is set, then the drum counter is cleared, and at the same time, the interrupt inhibition other than for the index interrupt is cancelled, thus terminating the index interrupt processing routine (steps 508 through 512).

If the optical scanning inhibition flag is ON, the processing proceeds to the step 508. However, in this state, the writing and optical reading scanning are not required, and accordingly, the processing proceeds to the step 511.

Additionally, if the current mode is either the two- or three-color copy mode, the processing proceeds to the pre-rotation start check step 509, as mentioned previously.

Figure 30:
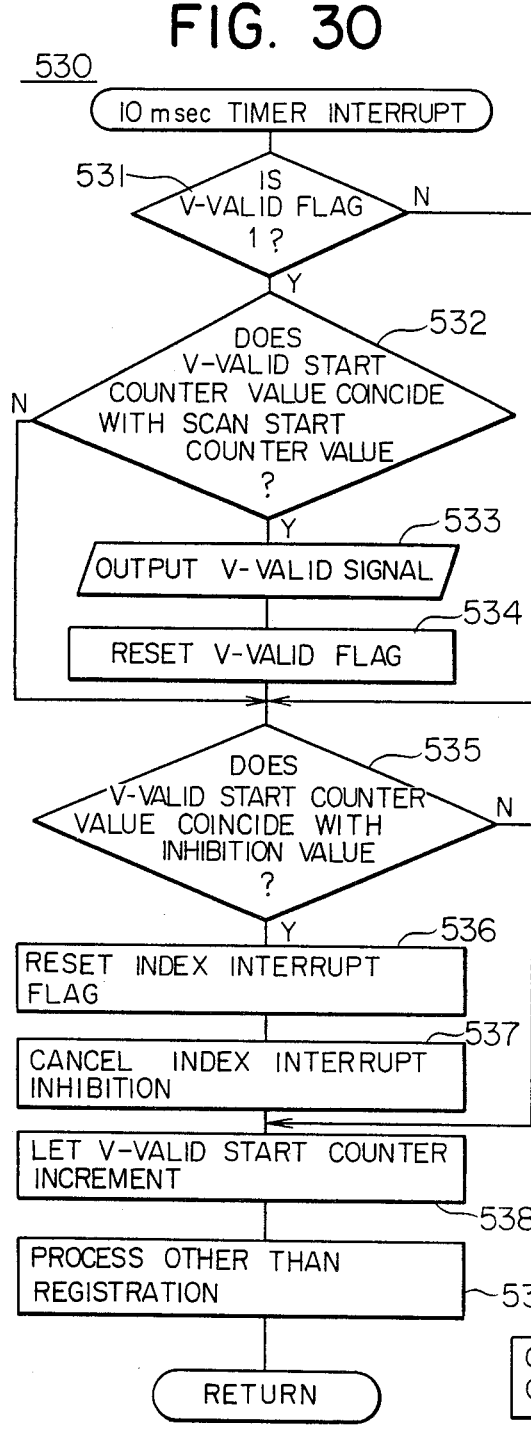

FIG. 30 illustrates one example of timer interrupt process routine 530 to coordinate the writing timing.

The interrupt process is performed periodically, based on the reference timer signal. Since the reference timer of the example generates a pulse every 10 msec, accordingly, a case where the reference timer interrupt process is performed every time a 10 msec pulse is generated is described below. The interrupt process starts every time the pulse is generated, then the flag for vertical direction valid signal (V-VALID) is checked. If the flag is ON, whether or not the counted value of vertical direction valid signal (V-VALID) start counter corresponds with the scan start count value indicating the initial writing position with a laser is checked (steps 531 and 532).

In other words, as mentioned in the description of step 507, the generation of index signal clears the start counter of vertical direction valid signal (V-VALID), and, consequently, when the counted value reaches a specific value (preset value corresponding to the stand-by period TS) (FIG. 36-D), the image writing with a laser is commenced (FIG. 36-E). Correspondingly, once the counted value of the above V-Valid start counter coincides with the preset value of scan start, the vertical direction valid signal (V-VALID) is outputted to the timing circuit 102 in order to start the image writing, then the flag of vertical direction valid signal (V-VALID) is reset (steps 533 and 534), and the processing proceeds to the next step.

At this time point, if the reference timer is restarted based on the drum index signal, a period starting when the index signal is obtained and terminating when the stand-by period terminates is always constant regardless of the rotational rate of drum, and does not vary even if a manner of interruption with drum index signal varies every time the drum turns. This arrangement enables the leading edge position of original document to be constantly coordinated with the rotating position of drum, that is, with the writing timing of image data.

If the flag of vertical direction valid signal (V-VALID) is not ON, or if the counted value of vertical direction valid signal (V-VALID) counter does not correspond with the preset value of scan start, the processing immediately proceeds to the step 535.

In the step 535, whether or not the counted value of V-VALID start counter corresponds with the index interrupt inhibition period is checked. The step 535 is, as mentioned previously, a step which inhibits the index interruption with index signal and other signals even if such signals are inputted, in order to prevent the writing with laser from being erroneously commenced by a noise or the like generated during the stand-by period TS.

For this reason, the predetermined count value in the step 535 is set to be a count value corresponding with the interrupt inhibit period TM, or a period immediately before the next index signal.

Once the counted value of vertical direction valid signal (V-VALID) start counter reaches the above-mentioned count value, the optical system can be restarted, and at this state, the index interrupt flag is reset and simultaneously the index interrupt inhibition is canceled (steps 536 and 537).

Additionally, in this example, an arrangement is incorporated, wherein even after the V-VALID start counter completes counting the stand-by period and the image writing has been commenced the counting sequence of V-VALID start counter is allowed to continue so as to count the interrupt inhibition period. However, another counter (inhibit counter) associated with interrupt inhibition period may be additionally provided.

If the counted value of V-VALID start counter is smaller than the scan start count value, the processing jumps from the step 532 to the step 535. In this case, the counted value in the step 535 is naturally smaller than the count value representing the interrupt inhibition period, and the processing further jumps from the step 535 to the step 538.

In the step 538, the counted value of the vertical direction valid signal (V-VALID) is incremented, then, the processes other than those associated with the registration are performed and the processing returns to the main routine (steps 538 and 539).

As mentioned previously, the reference timer interruption process is executed every time a 10 msec pulse is generated. Accordingly, in the step 538, the V-VALID start counter counts the pulses of reference timer, as illustrated in FIG. 36-D, and in the steps 532 and 536, whether or not the counted value corresponds with the predetermined value is checked.

The above describes the control program associated with the first microcomputer 201.

Figure 31:
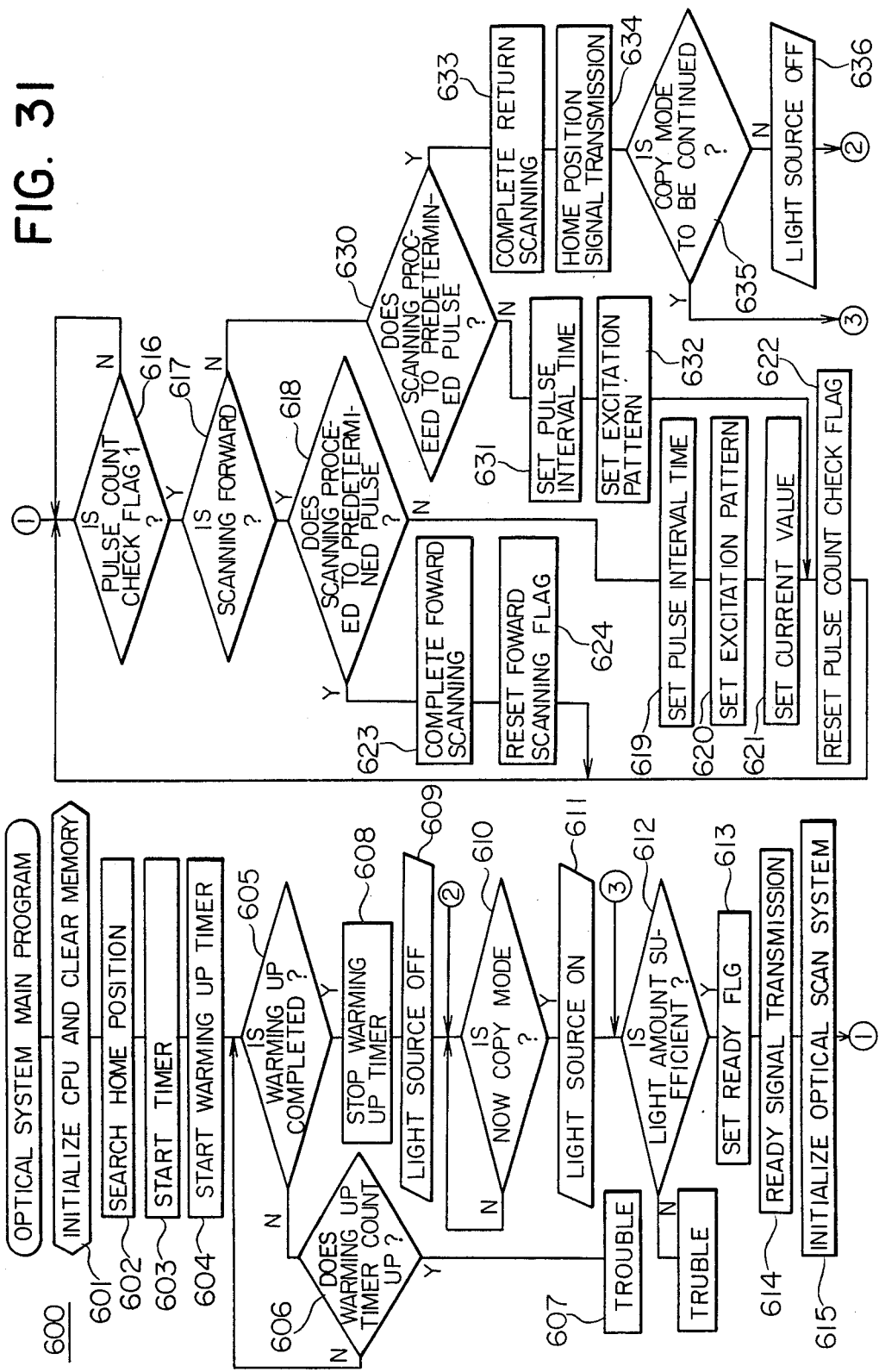

Next, the control program of the second microcomputer 251 is described in detail with the reference to FIG. 31 onwards. The second microcomputer is principally for controlling the optical system.

FIG. 31 illustrates a flowchart of main routine associated with the optical system. Upon the initiation of this control program, the CPU on second microcomputer 251 is initialized and at the same time the memory is cleared, then the home position search of optical system is initiated. Next, a timer for warmup measurement is activated to start the warming up (steps 601 through 604).

Once warming up starts, whether or not the warming up has completed is checked. If the warming up is not complete, then whether or not a predetermined warming up period has expired is checked. If satisfactory warming up is not complete, even after the expiration of such a period, a trouble message is displayed (steps 605 through 607).

Once the warming up has satisfactorily completed, the warming up timer is canceled, and simultaneously a light source (for example, a fluorescent lamp) to illuminated the original document 1 is turned OFF (steps 608 and 609).

Next, whether the current mode is a copy mode or not is examined. If the current mode is a copy mode, the light source is turned ON, and simultaneously, the intensity of light reflected by the original document is monitored. If the intensity of reflected light is insufficient, a trouble message is displayed, and if the monitored result is satisfactory, the READY flag is set to transmit the READY signal to the second microcomputer 251, and simultaneously, the optical scanning is initialized (steps 610 through 615).

Upon the completion of initialization of the optical scanning, the pulse count check flag is examined. If the flag has been already set, whether the optical system is in forward moving mode o not is checked. If the system is in the forward moving mode, whether or not the system has advanced by a specific distance is judged based on the counted value of the above mentioned pulse count (steps 616 through 618).

If the above counted value has not been reached, the pulse interval time is set, then the excitation pattern is set, and simultaneously, the electrical current is set at a specific level. Next, the pulse count check flag is reset, and the processing returns to the step 616 (steps 619 through 622).

When a specific number of pulses have been counted, the optical system has advanced to the maximum scanning position in the sub-scanning direction. In this case, the optical system completes scanning, and the forward scanning flag is to be reset (steps 623 and 624).

Th backward movement of optical system is judged in the step 617. If the current mode is the backward movement mode, a predetermined number of pulses are checked, similarly to the above description. If not in the backward movement mode, the pulse interval time is set, and simultaneously, the excitation pattern is set, then the processing returns to the step 622 (steps 630 through 632).

When a predetermined number of pulses have been counted, the backward movement (return) of optical system terminates, and the home position signal is transmitted from the second microcomputer 251 to the first microcomputer 201, then whether or not the current mode is a copy mode is judged. The judgement of copy mode is a step to judge whether or not the current mode is a copy mode. When only one sheet of copying is performed, the light source is consequently turned OFF and the processing returns to the step 610. In the case of continuous copying operation, the processing returns to the step 612 (steps 633 through 636).

Figure 32:
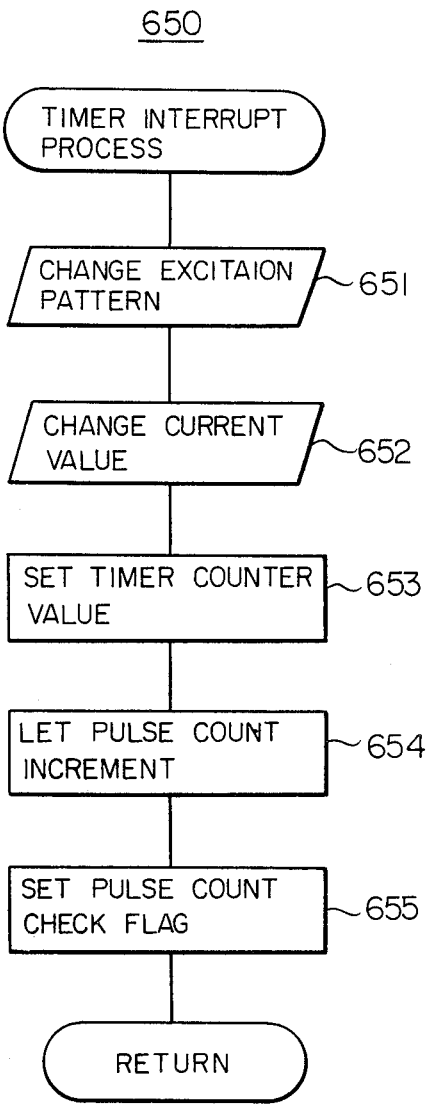

FIG. 32 illustrates one example of optical system driving control program 650. When the interrupt process routine of test pattern switching timer for the pulse motor 253 starts, the excitation pattern switching signal is transmitted to a driving circuit 252 associated with the pulse motor 253 which drives the optical system, and simultaneously, the level of electrical current fed to the pulse motor 253 is switched (steps 651 and 652), then the timer is set to increment the pulse count value. Next, the pulse count check flag is set, which returns the processing from this control routine to the main routine (steps 653 through 655).

Figure 33:
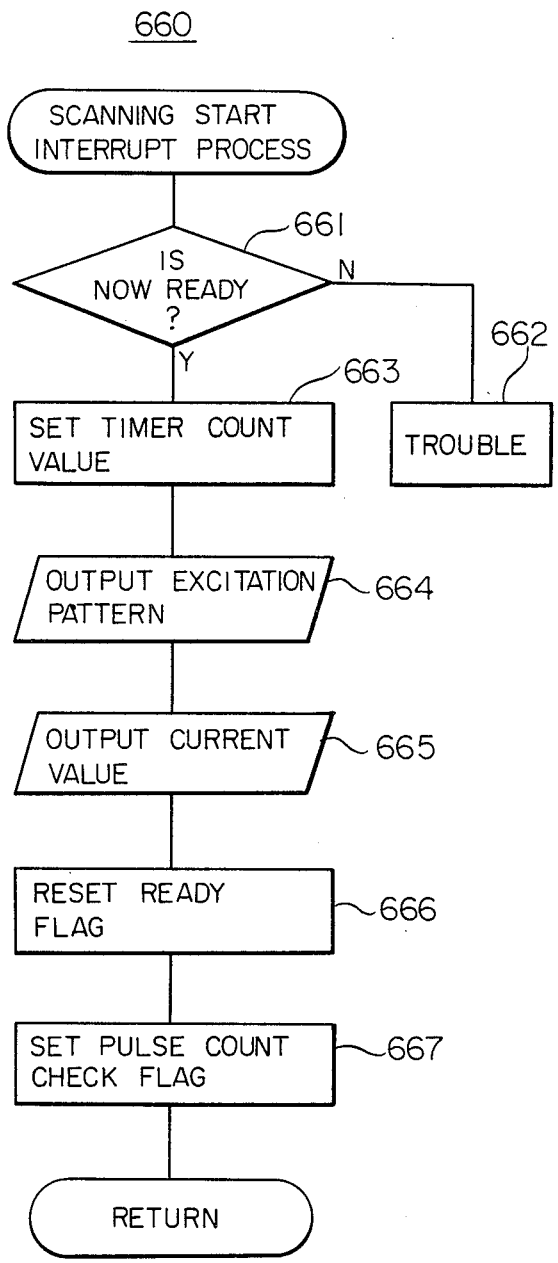

FIG. 33 illustrates one example of scanning start interrupt process program 660 executed when the scanning start signal is transmitted from the first microcomputer 201 in order to call the scanning start interrupt process routine. When scanning start interrupt process starts, whether the current status is READY status or not is judged. If the current status is not READY status, a trouble message is displayed. If the current status is READY status, the excitation pattern and the level of current are outputted after the timer count value is set (steps 661 through 665), then the READY flag and the pulse count check flag are set (steps 666 and 667). When the pulse count flag is set, the current processing routine is terminated and the processing returns to the main routine.

As described above, according to the invention, when using a drum index signal to control the image data writing timing, the drum index signal restarts the reference timer. This arrangement enables the initial writing timing to be constantly the same even if the drum index signal interrupt timing varies every time the drum turns.

Consequently, even if independent color images are superposed on each other in several steps to complete recording a color image, every image corresponding with each independent color is recorded exactly based on the leading edge of original draft, which in turn ensures the color image recording with excellent registration. Accordingly, the image recording system of the invention readily provides color image recording featuring improved image quality.

With this arrangement, registration does not deteriorate even when the load exerted upon drum fluctuates, because the writing start timing is controlled based on the drum rotation.

Accordingly, the invention is quite advantageously embodied as a color photocopying apparatus which records a color image as required by superposing a plurality of independent color images as mentioned above.

Next, another preferred example using, in addition to the drum index signal, an encoder signal as reference signal associated with the initial writing position. As the encoder signal, for example, a signal obtained from a frequency generator (FG) associated with a drum driving motor.

The encoder signal provides n segments of pulses per one rotation of drum m. Accordingly, by basing on the pulses, an arbitrary position on the circumferential surface of drum is readily detected. This arrangement makes it unnecessary to wait until the completion of one rotation of drum and starts next copying operation, which in turn greatly expedites the copying operation.

Correspondingly, the encoder signal is used as a reference signal during mono-color copy mode. In contrast, during multi-color copy mode, the index signal is used as a reference signal.

Figure 39:
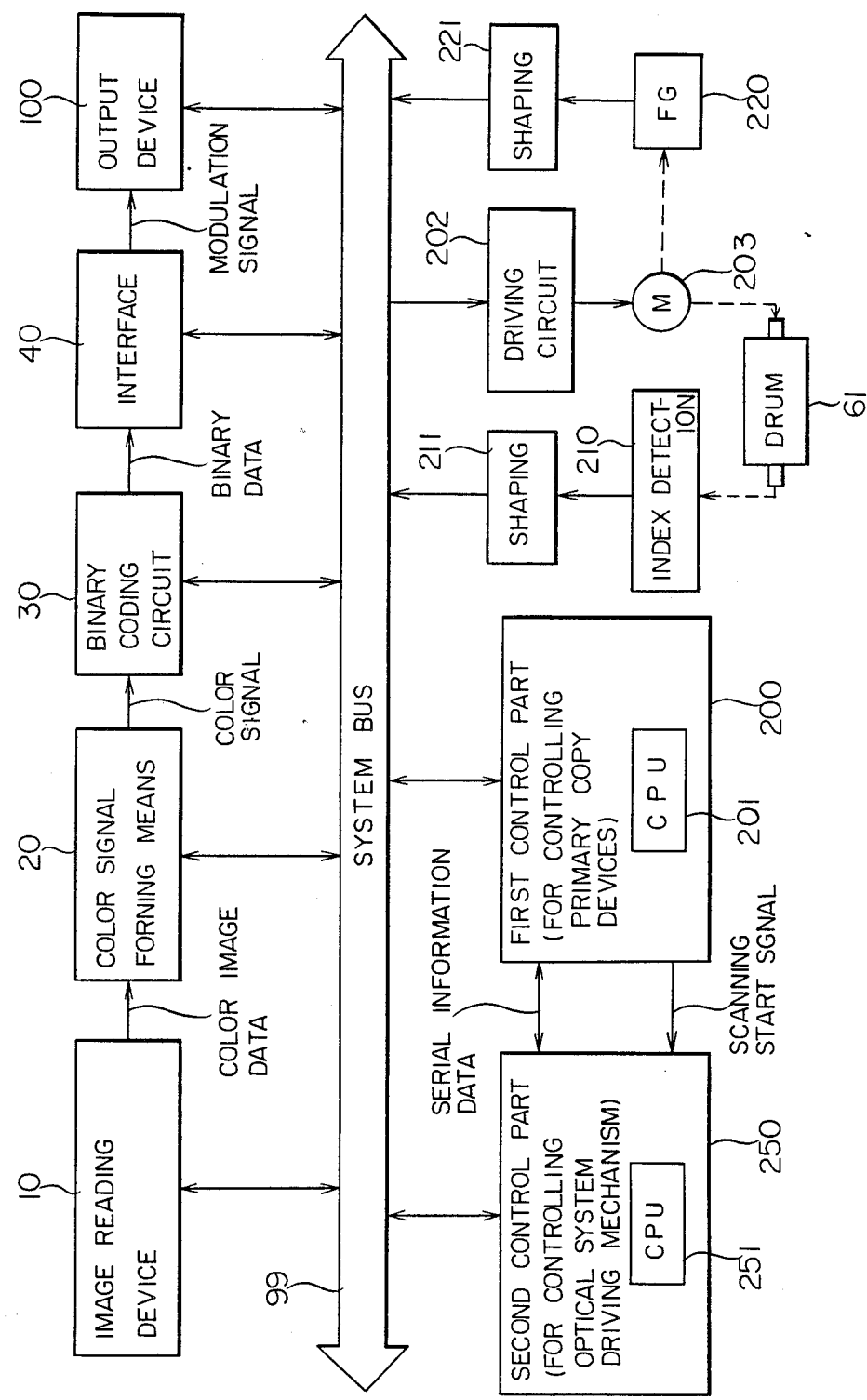
FIG. 39 is a block diagram schematically illustrates the system constitution of another embodiment of a color image processing system according to the invention.

FIG. 39 illustrates one example constituted by incorporating partial improvement into the example previously described with the reference to FIG. 1.

In FIG. 39, the like reference numerals independently have the like meaning as in FIG. 1.

In FIG. 39, a first controller 200 supplies a driving signal to a main motor 203 via a driving circuit 202. The main motor 203 drives an image forming member (photosensitive drum) 61 (refer to FIG. 2).

As the reference signal for writing start timing associated with the image forming member 61, both index signal and encoder signal are used.

Correspondingly, the image forming member 61 is provided with a index signal detecting means 210. The rotation signal detected by the detecting means 210 is supplied into a waveform shaping circuit 211, where the index signal is generated.

The index signal is fed into the external interrupt terminal on the CPU 201 provided on the first controller 200. Therefore, every time the index signal is generated, the interrupt occurs.

Additionally, a frequency generator 220 associated with the driving motor 203 is provided. The output from the generator is shaped in a waveform shaping circuit 221 to generates the encoder signal.

The encoder signal is fed into the count input terminal on the CPU 201, where the entered encoder signal is divided into independent signals respectively having a specific level. The interrupt is performed per each of the divided encoder signals.

An encoder signal generating means 220 may be a clock generating circuit being synchronized with the start of driving motor 203.

As an index detecting means 210, the similar means illustrated in FIG. 20 or FIG. 21 is used. In the previous example embodying the invention, the example of drum index element 95 has only one notch 97. However, the invention is not bound by this example, and the element 95 may have a plurality of notches 97.

If a plurality of notches are formed, a segments of index signal pulses are detected per one rotation of the drum 61.

In the example discussed here, a series of color image processing for color copying mode is controlled by the already described first and second microcomputers 201 and 251, whereby principally the processing is performed in compliance with the steps 30 through 314, step 320 and step 360 described in FIG. 25.

In the case of monocolor copy mode in the step 320, the steps 321 through 354 in the flowchart in FIG. 26 are similarly performed, however, in the example discussed here, the interruption is performed by using the signal from encoder.

More specifically, in a mono-color copy mode, every reception of encoder signal activates interruption. In this interrupt routine, each counter necessary for the mono-color copy mode is incremented.

Figure 40:
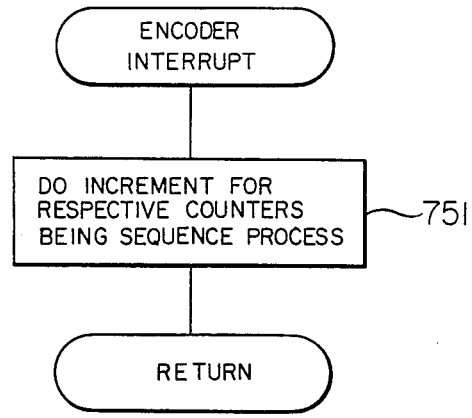
FIGS. 40 through 42 are flowcharts jointly illustrate another example of a control program.

FIG. 40 illustrates one example of interrupt processing routine 750. When this routine is called, various counters in the copy sequence are incremented (step 551).

These counters are for example, counters to determine start timing per individual colors, scanning start output timing counter, and counters required for copying sequence.

In continuous copying operation, a next copy sequence start flag is set at the step 346. When the next scan start output timing is reached, the optical scanning start signal is immediately transmitted, which in turn starts a next copying sequence (steps 347 and 348).

This means that a next copy sequence is commenced, when the next scan start output timing arrives, even if one rotation of drum has not yet been completed. This feature reduces the copying duration during the continuous copying mode. copy process is called, the steps 361 through 382 in the Next, with the example here, when a two- or three-color flowchart of FIG. 27 as well as the steps 401 through 413 in the flowchart of FIG. 28 are simultaneously executed in compliance with respective sequence.

Figure 41:
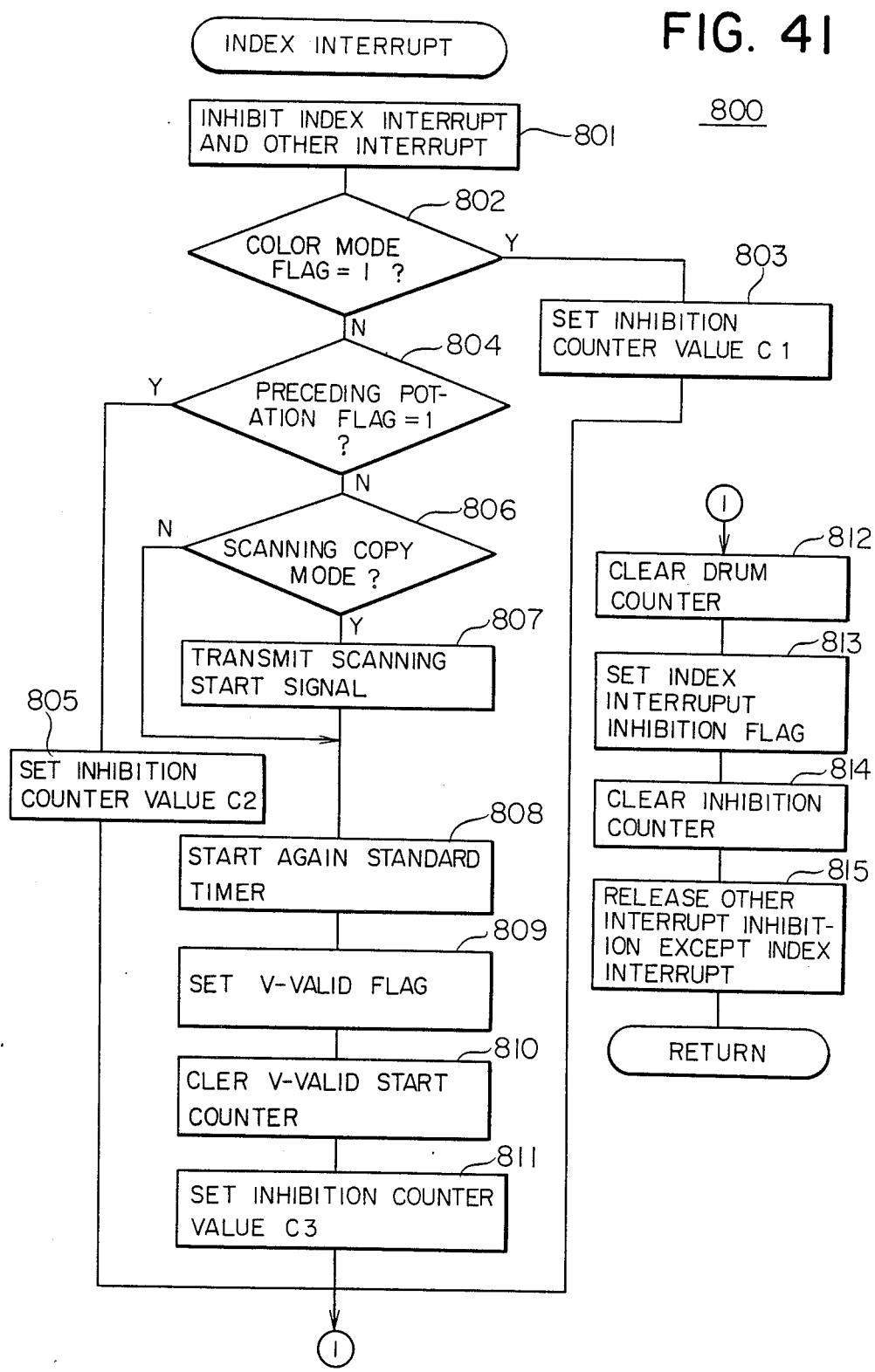

FIG. 41 schematically explains the index interrupt process, wherein a plurality of notches 97 are formed on the drum index element 95.

When the index interrupt starts, another index interruption and other interruption are inhibited (step 801). The reason for incorporation of such a step is to prevent this control process routine from being erroneously activated by pulse configured external noise, other than by the trailing edge of index signal.

Whether or not the current period is the interrupt inhibit period where the interrupt with index signal or another signal is judged in the step 836 incorporated into another processing routine 830 described later.

When the index interrupt inhibit process has been performed, whether or not color mode flag is ON is checked (step 802). The color mode flag is set at 1 under the following conditions.

In mono color copy mode, the copy sequence is controlled based on the encoder signal. More specifically, a sequence to start the optical scanning in synchronization with the index signal and to start image writing on the image forming member 61 has not been selected, and accordingly, this flag is to be set in monocolor copy mode.

Additionally, the pre-rotation treatment and post-rotation treatment do not necessarily require the processing which used the index signal. Accordingly, in these treatments too, the flag is turned ON.

For this reason, when the current mode is a two- or three-color copy mode, and other than during either the pre-rotation treatment or post-rotation treatment, the flag is to be reset.

If the color mode flag has been already set, the value of inhibit counter is set to a specific count value C1 (step 803). The counter value C1 is a specific value determined so as to preclude the erroneous action by the index signal during processing.

If the color mode has been already set, and if the pre-rotation flag has been already set too, the value of inhibit counter is set to a specific count value C2 (steps 804 and 805). This inhibits the index signal interrupt during the pre-rotation period.

Upon completion of the pre-rotation, whether or not a current mode is scanning copy mode is checked in the ensuing step 806. If the current mode is not a scanning copy mode, the apparatus functions as a printer to write a signal transmitted from a printer controller (unshown). This arrangement eliminates the optical scanning, and the process in step 806 is skipped to immediately perform the processes in step 808 onwards.

Correspondingly, in this case, the optical scan start signal is not transmitted from the first microcomputer 201 to the second microcomputer 251.

On the other hand, if the current mode is a scanning copy mode, the scan start signal to start the optical scanning is transferred from the first microcomputer 201 to the second microcomputer 251 (step 807). This allows the optical system to promptly start the optical scanning (FIG. 36-F).

Upon initiation of the optical scanning, the reference timer used to coordinate the writing timing with the scanning restarts (step 808). By counting the restarted reference timer pulses in the reference timer interrupt routine, the distance from the initial optical scanning point to the leading edge of original document. In this example, the pulse is outputted every 10 msec (FIG. 36-C).

By starting the reference timer in synchronization with the index signal, the reference timer is restarted every time the drum 61 completes one rotation. Correspondingly, even if the interrupt timing with the drum index signal differs every time the drum 61 turns, it is always possible to align each other the initial rotating position of drum 61, the writing start timing with laser, and the position of leading edge of original draft relative to the optical system, by designating image data writing start timing of the optical system based on the number of counted reference timer pulses (FIGS. 36-D and -E).

As the reference timer restarts, the flag of vertical direction valid signal (V-VALID) is set, and simultaneously, the start counter of vertical direction valid signal (V-VALID) is cleared, then the inhibit counter is set to a specific count value C3 (steps 809 through 811).

The start counter is used to designate the initial writing position of a laser, and to designate the valid reading area in the sub-scanning direction, and its counted value increments in the reference timer interrupt routine 830.

The count value C3 is set to a specific value which can inhibits interruption with another index signal, within a period starting when the optical scanning is started by one index signal pulse among a plurality of index signal pulses and lasting until when the drum nearly completes one rotation. Accordingly, such a processing step is not necessarily required especially when a detecting means 210 shown in FIG. 21 which produces only one pulse per one drum rotation is used.

If the detecting means has a constitution which allows the generation of n segments of pulses per one rotation of drum 61, the step 811 is required, since an erroneous action may occur if interrupt is performed by another index signal generated during a copying process.

Upon completion of these processes, the drum counter is cleared, and at the same time, the index signal interrupt inhibit flag is set, and the inhibit counter is cleared, and at the same time, the inhibit status other than for the index interrupt is canceled, thus terminating index interrupt processing routine (steps 812 through 815).

If the color mode flag is ON, the processing proceeds to the step 803. However, in this state, the writing and optical scanning in the step 804 onwards are not required, and accordingly, the processing proceeds to the step 812.

Figure 42:
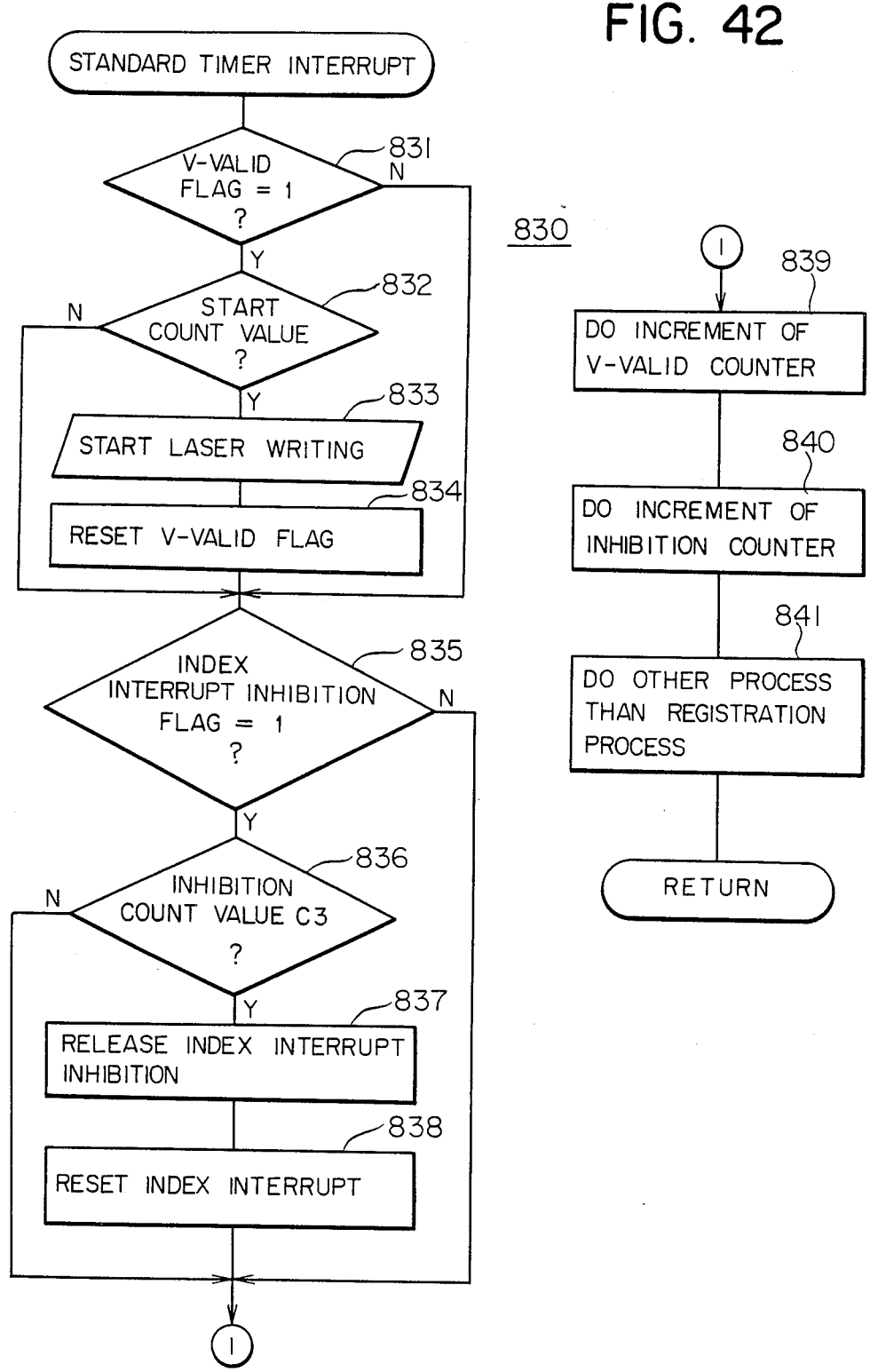

FIG. 42 illustrates one example of timer interrupt process routine 830 to coordinate the writing timing.

Similarly to the example in FIG. 30, the interrupt process is performed periodically, based on the reference timer signal. Once the interrupt process starts, the flag for vertical direction valid signal (V-VALID) is checked. If the flag is ON, whether or not the counted value of vertical direction valid signal (V-VALID) start counter corresponds with the scan start count value indicating the initial writing position with a laser is checked (steps 831 and 832).

In other words, as the start counter of vertical direction valid signal (V-VALID) starts counting and the counted value thereof reaches a specific value (preset value corresponding to the stand-by period TS) (FIG. 36-D), the image writing onto the drum 61 with a laser is commenced (FIG. 36-E). Correspondingly once the counted value of the above counter coincides with the preset value of scan start count value, the vertical direction valid signal (V-VALID) is outputted in order to start the writing with a laser, then the flag of vertical direction valid signal (V-VALID) is reset (steps 833 and 834), and the processing proceeds to the next step.

At this time point, if the reference timer is restarted based on the drum index signal, a period starting when the index signal is obtained and terminating when the stand-by period terminates is always constant regardless of the rotational rate of drum, and does not vary even if a manner of interruption with drum index signal varies every time the drum turns. This arrangement enables the leading edge position of original document to be constantly coordinated with the rotating position of drum, that is, with the writing timing of image data.

In the case of a mono-color copy mode, the reference timer restarts base on the encoder signal. If the flag of vertical direction valid signal V-VALID is not ON, or if the counted value of vertical direction valid signal V-VALID start counter does not coincides with the preset value of scan start, the processing immediately proceeds to the step 835.

In the step 835, the index interrupt inhibition flag is checked. If this flag has been already set, the counted value of the inhibit counter is checked in the step 836.

The step 836 is, as mentioned previously, a step which inhibits the input of index signal and other signals into index interrupt routine even if such signals are inputted, in order to prevent the writing with laser from being erroneously commenced by a noise or the like generated during the standby period TS.

For this reason, the predetermined count value of the inhibit counter is set to a count value C3 corresponding with the interrupt inhibit period TM, or a period immediately before the next index signal.

For this reason, the steps 836 through 838 are not used in a mono-color copy mode.

Once the counted value of inhibit counter coincides with the predetermined count value C3, the optical system may restart. Accordingly, in this state, the index interrupt inhibit is canceled and the index interrupt flag is reset (steps 837 and 838).

Then, the vertical direction valid signal V-VALID start counter as well as inhibit counter are allowed to increment, and the processes other than those for registration are executed, then the processing returns to the main routine (steps 839 through 841).

In this preferred example, as well as the previously mentioned preferred example, the encoder signal is used, in two- or three-color copy mode, for incrementing the sequence counter associated with copying processes other than for registration.

What is claimed is:

1. A color image-processing apparatus comprising a scanning means for scanning and photoelectrically converting a color image on an original document into color image signals;
   a signal-processing means for producing a plurality of color component signals on the basis of said color image signals;
   an optical means for projecting a light beam corresponding to a selected one of said color component signals onto an image forming means to form a corresponding image thereon;
   said image forming means being rotatable so as to form a plurality of color toner images each corresponding to a respective one of said color component signals in such a manner that said plurality of color toner images are formed at the same position on said image forming means during plural rotations thereof;
   a control means repeatedly actuating said scanning means, said signal processing-means, said optical means, and said image forming means so that said plurality of color toner images are formed at the same position on said image forming means;
   an index means for generating an index signal at a time corresponding to an initial image forming point of a color toner image to be formed for each rotation of said image forming means; and
   said control means determining scanning-start timing of said scanning means by an interrupt process in response to the index signal so that the initial image forming point of said color toner image to be formed is registered at the same position as that of another color toner image which has already been formed on said image forming means.

2. The apparatus of claim 1 comprising an external input means for designating one of said plurality of color component signals for transmission to said optical means.

3. The apparatus of claim 1 comprising respective developing devices for forming each of said toner images.

4. The apparatus of claim 3 wherein each of said developing devices is of a non-contact type.

5. The apparatus of claim 3 wherein each of said developing device is adapted to develop one of red, blue, and black images.

6. The apparatus of claim 1 wherein said light beam is a laser beam.

7. The apparatus of claim 1 wherein said control means is adapted to control said optical means so as to cause it to begin projecting said light beam onto said image forming means after elapse of a predetermined time period after detection of said index signal.

8. The apparatus of claim 1 comprising a timing means for determining said initial image forming point, said timing means being reset upon receipt of said index signal.

9. The apparatus of claim 8 wherein said timing means comprises a reference timer for generating a series of pulses at constant intervals and a counter, said reference timer adapted to be cleared and restarted on receipt of said index signal, said timing means outputting a start timing signal after said counter counts a predetermined number of said pulses after receipt of said index signal.

10. The apparatus of claim 9 wherein said optical means is adapted to begin projecting said light beam onto said image forming means upon receipt of said start timing signal.

11. The apparatus of claim 1 wherein, during said interrupt process, said control means inhibits both said interrupt process and another interrupt process responsive to another signal.

12. The apparatus of claim 11 wherein, after completion of said interrupt process responsive to said index signal, said control means releases the inhibition of said another interrupt process responsive to said another signal.

13. The apparatus of claim 12 wherein, after commencement of said interrupt process, said control means inhibits said another interrupt process for at least a predetermined time period corresponding to said initial image forming point.

14. The apparatus of claim 1, comprising a timing means for counting a predetermined time period corresponding to said initial image forming point, said timing means being reset and restarted in said interrupt process in response to said index signal.

15. The apparatus of claim 1 wherein said control means starts said scanning means at the beginning of said interrupt process.

16. A color image processing apparatus comprising an optical means for projecting a light beam corresponding to a color image signal onto an image forming means, said image forming means being rotatable so as to form a latent image thereon corresponding to said color image signal in response to said light beam;
    a motor for driving said image forming means;
    an encoder with said motor, for generating an encoder signal;
    an index means, associated with said image forming means, for generating an index signal representing a position of said image forming means; and
    a control means for selecting one of said encoder signal and said index signal in accordance with a selected copy mode and for controlling start timing of said optical means based thereon.

17. The apparatus of claim 16 which selectively operates in a monocolor copy mode and multicolor copy mode.

18. The apparatus of claim 17 wherein said index signal is selected in said multicolor copy mode.

19. The apparatus of claim 17 wherein said encoder signal is selected in said monocolor copy mode.

* * * * *

UNITED STATES PATENT AND TRADEMARK OFFICE
CERTIFICATE OF CORRECTION

PATENT NO. : 4,878,110

DATED : Oct. 31, 1989

INVENTOR(S) : HIROYUKI MARUYAMA; TADAO KISHIMOTO; TOCHIFUMI ISOBE; and JUN YOKOBORI It is certified that error appears in the above-identified patent and that said Letters Patent is hereby corrected as shown below:

On the title page, add: --[30] Foreign Application Priority Data

```
              Japan 191214 /1986   8/15/86
              Japan 191215/1986    8/15/86
              Japan 191216/1986    8/15/86
              Japan 191217/1986    8/15/86--
```

Signed and Sealed this

Nineteenth Day of February, 1991

Attest:

HARRY F. MANBECK, JR.

*Attesting Officer*  *Commissioner of Patents and Trademarks*